United States Patent
Adcock et al.

(10) Patent No.: US 11,615,471 B2
(45) Date of Patent: *Mar. 28, 2023

(54) UNPRICED ORDER AUCTION AND ROUTING

(71) Applicant: NYSE Group, Inc., New York, NY (US)

(72) Inventors: Paul D. Adcock, Burr Ridge, IL (US); Michael A. Cormack, Evanston, IL (US); Thomas F. Haller, Longwood, FL (US); Robert A. Hill, LaGrange, IL (US)

(73) Assignee: NYSE Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,878

(22) Filed: Aug. 15, 2022

(65) Prior Publication Data
US 2022/0391985 A1 Dec. 8, 2022

Related U.S. Application Data

(63) Continuation of application No. 17/221,106, filed on Apr. 2, 2021, now Pat. No. 11,455,687, which is a
(Continued)

(51) Int. Cl.
*G06Q 40/04* (2012.01)
*G06Q 30/08* (2012.01)

(52) U.S. Cl.
CPC ............ *G06Q 40/04* (2013.01); *G06Q 30/08* (2013.01)

(58) Field of Classification Search
None
See application file for complete search history.

(56) References Cited

U.S. PATENT DOCUMENTS

| 5,845,266 A | 12/1998 | Lupien et al. |
| 5,950,176 A | 9/1999 | Keiser et al. |

(Continued)

FOREIGN PATENT DOCUMENTS

| AU | 2006/244479 | 5/2006 |
| AU | 2006/244483 | 5/2006 |

(Continued)

OTHER PUBLICATIONS

"Electronic Trading in Financial Markets" by Terrence Hendershott, IT Pro published by the IEEE Computer Society, Jul./Aug. 2003, pp. 10-14 (Year: 2003).*

(Continued)

*Primary Examiner* — Abhishek Vyas
*Assistant Examiner* — Blane A Lickteig
(74) *Attorney, Agent, or Firm* — DLA Piper LLP (US)

(57) ABSTRACT

An unpriced order auction and related market center and process are disclosed which allow posting market centers (e.g., exchanges) to schedule an auction that includes unpriced (Market) orders only. Such unpriced order auction executes at the midpoint of the NBBO, ensuring that the cross reflects the best prices in the entire marketplace, while discouraging the manipulation of the auction price on the posting market center. The disclosed auction also executes concurrently, but separately from the regular continuous matching process.

14 Claims, 10 Drawing Sheets

Related U.S. Application Data continuation of application No. 16/803,669, filed on Feb. 27, 2020, now Pat. No. 10,997,659, which is a continuation of application No. 11/416,913, filed on May 3, 2006, now Pat. No. 10,885,582.

(60) Provisional application No. 60/678,021, filed on May 5, 2005.

(56) References Cited

U.S. PATENT DOCUMENTS

| | | |
|---|---|---|
| 6,012,046 A | 1/2000 | Lupien et al. |
| 6,098,051 A | 8/2000 | Lupien et al. |
| 6,343,278 B1 | 1/2002 | Jain et al. |
| 6,377,940 B2 | 4/2002 | Tilfors et al. |
| 6,405,180 B2 | 6/2002 | Tilfors et al. |
| 6,408,282 B1 | 6/2002 | Buist |
| 6,618,707 B1 | 9/2003 | Gary |
| 6,714,948 B1 | 3/2004 | Richards |
| 6,832,210 B1 | 12/2004 | Li |
| 6,983,260 B2 | 1/2006 | Hummelgren |
| 7,162,448 B2 | 1/2007 | Madoff et al. |
| 7,184,982 B1 | 2/2007 | Howorka et al. |
| 7,197,483 B2 | 3/2007 | Brady et al. |
| 7,209,896 B1 | 4/2007 | Serkin et al. |
| 7,225,153 B2 | 5/2007 | Lange |
| 7,242,669 B2 | 7/2007 | Bundy et al. |
| 7,246,090 B1 | 7/2007 | Thomas |
| 7,246,093 B1 | 7/2007 | Katz |
| 7,249,086 B2 | 7/2007 | Bloom et al. |
| 7,356,498 B2 | 4/2008 | Kaminsky et al. |
| 7,383,220 B1 | 6/2008 | Keith |
| 7,401,046 B2 | 7/2008 | Hollerman et al. |
| 7,467,110 B2 | 12/2008 | Müller et al. |
| 7,765,137 B1 | 7/2010 | Adcock et al. |
| 7,873,544 B2 | 1/2011 | Adcock et al. |
| 7,873,561 B1 | 1/2011 | Adcock et al. |
| 7,877,316 B2 | 1/2011 | Adcock et al. |
| 7,912,775 B1 | 3/2011 | Brill et al. |
| 7,917,418 B2 | 3/2011 | Jimenez et al. |
| 7,937,315 B2 | 5/2011 | Adcock et al. |
| 7,949,596 B2 | 5/2011 | Adcock et al. |
| 8,195,557 B2 | 6/2012 | Adcock et al. |
| 8,738,484 B2 | 5/2014 | Adcock et al. |
| 8,799,131 B2 | 8/2014 | Cormack et al. |
| 9,799,072 B2 | 10/2017 | Haller et al. |
| 10,198,767 B2 | 2/2019 | Armstrong |
| 2001/0037284 A1 | 11/2001 | Finkelstein et al. |
| 2002/0010672 A1 | 1/2002 | Waelbroeck et al. |
| 2002/0010673 A1 | 1/2002 | Muller et al. |
| 2002/0019795 A1 | 2/2002 | Madoff et al. |
| 2002/0019799 A1 | 2/2002 | Ginsberg et al. |
| 2002/0042765 A1 | 4/2002 | Dawson |
| 2002/0062273 A1 | 5/2002 | Perkel et al. |
| 2002/0091617 A1 | 7/2002 | Keith |
| 2002/0091621 A1 | 7/2002 | Conklin et al. |
| 2002/0128951 A1 | 9/2002 | Kiron et al. |
| 2002/0128955 A1 | 9/2002 | Brady et al. |
| 2002/0128958 A1 | 9/2002 | Slone |
| 2002/0143676 A1 | 10/2002 | Kiron et al. |
| 2002/0147670 A1 | 10/2002 | Serkin et al. |
| 2002/0161687 A1 | 10/2002 | Serkin et al. |
| 2002/0184135 A1 | 12/2002 | Zakaria |
| 2002/0184136 A1 | 12/2002 | Cleary Neubert et al. |
| 2002/0198815 A1 | 12/2002 | Greifeld et al. |
| 2002/0198816 A1 | 12/2002 | Gilbert et al. |
| 2003/0004851 A2 | 1/2003 | Kiron et al. |
| 2003/0004858 A1 | 1/2003 | Schmitz et al. |
| 2003/0009400 A2 | 1/2003 | Kiron et al. |
| 2003/0009412 A1 | 1/2003 | Furbush et al. |
| 2003/0009413 A1 | 1/2003 | Furbush et al. |
| 2003/0009414 A1 | 1/2003 | Furbush et al. |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0093343 A1 | 5/2003 | Huttenlocher et al. |
| 2003/0097328 A1 | 5/2003 | Lundberg et al. |
| 2003/0115131 A1 | 6/2003 | Heaton et al. |
| 2003/0130920 A1 | 7/2003 | Freund |
| 2003/0130925 A1 | 7/2003 | Malitzis |
| 2003/0130926 A1 | 7/2003 | Moore et al. |
| 2003/0135443 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwaiter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 | 12/2003 | Salvador et al. |
| 2004/0030630 A1 | 2/2004 | Tilfors et al. |
| 2004/0043542 A1 | 3/2004 | Park et al. |
| 2004/0059666 A1 | 3/2004 | Waelbroeck et al. |
| 2004/0088242 A1 | 5/2004 | Ascher et al. |
| 2004/0143538 A1 | 7/2004 | Korhammer et al. |
| 2004/0143542 A1 | 7/2004 | Magil et al. |
| 2004/0177024 A1 | 9/2004 | Bok et al. |
| 2004/0177026 A1 | 9/2004 | Balabon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Churquina |
| 2004/0236662 A1 | 11/2004 | Korhammer et al. |
| 2004/0236669 A1 | 11/2004 | Horst et al. |
| 2004/0243502 A1 | 12/2004 | Slowik et al. |
| 2004/0254804 A1 | 12/2004 | Peterfly et al. |
| 2004/0254877 A1 | 12/2004 | Buckwalter et al. |
| 2004/0267655 A1 | 12/2004 | Davidowitz et al. |
| 2005/0010481 A1 | 1/2005 | Lutnick et al. |
| 2005/0075963 A1 | 4/2005 | Balabon |
| 2005/0096999 A1 | 5/2005 | Newell et al. |
| 2005/0119964 A1 | 6/2005 | Brady et al. |
| 2005/0125316 A1 | 6/2005 | Levering et al. |
| 2005/0137962 A1 | 6/2005 | Penney et al. |
| 2005/0160024 A1 | 7/2005 | Soderborg et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0171895 A1 | 8/2005 | Howorka et al. |
| 2005/0197916 A1 | 9/2005 | Newell et al. |
| 2005/0222936 A1 | 10/2005 | Panariti et al. |
| 2005/0228739 A1 | 10/2005 | Leibowitz |
| 2005/0240510 A1 | 10/2005 | Schweickert et al. |
| 2005/0273407 A1 | 12/2005 | Black et al. |
| 2005/0273408 A1 | 12/2005 | Bandman et al. |
| 2005/0273419 A1 | 12/2005 | Ogg et al. |
| 2005/0283415 A1 | 12/2005 | Studnitzer et al. |
| 2005/0283426 A1 | 12/2005 | Krishnasami et al. |
| 2005/0283427 A1 | 12/2005 | Owens et al. |
| 2005/0289042 A1 | 12/2005 | Friesen |
| 2006/0020536 A1 | 1/2006 | Renton et al. |
| 2006/0031157 A1 | 2/2006 | Gianakouros et al. |
| 2006/0036838 A1 | 2/2006 | Salcedo et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 | 7/2006 | Littlewood |
| 2006/0184444 A1 | 8/2006 | McConaughy et al. |
| 2006/0206404 A1 | 9/2006 | Hatheway et al. |
| 2006/0206407 A1 | 9/2006 | Troxel, Jr. et al. |
| 2006/0235786 A1 | 10/2006 | DiSalvo |
| 2006/0253374 A1 | 11/2006 | Adcock et al. |
| 2006/0253382 A1 | 11/2006 | Adcock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0078753 A1 | 4/2007 | Cormack et al. |
| 2007/0112693 A1 | 5/2007 | Cushing |
| 2007/0198391 A1 | 8/2007 | Dreyer et al. |

(56) References Cited

U.S. PATENT DOCUMENTS

| | | | |
|---|---|---|---|
| 2007/0244792 A1 | 10/2007 | Couperier et al. | |
| 2008/0040290 A1 | 2/2008 | Harris | |
| 2014/0081822 A1* | 3/2014 | Cushing | G06Q 40/04 705/37 |

FOREIGN PATENT DOCUMENTS

| | | | |
|---|---|---|---|
| AU | 2006/244563 | | 5/2006 |
| AU | 2006/244499 | | 11/2006 |
| AU | 2006/244562 | | 11/2006 |
| AU | 2006/244564 | | 11/2006 |
| AU | 2006/244566 | | 11/2006 |
| EP | 1 321 870 | | 6/2003 |
| JP | 2008-510109 | | 4/2008 |
| JP | 2008-510110 | | 4/2008 |
| JP | 2008-510226 | | 4/2008 |
| JP | 2008-510238 | | 4/2008 |
| SG | 2007/166754 | | 5/2006 |
| SG | 2007/166762 | | 5/2006 |
| SG | 2007/166770 | | 5/2006 |
| SG | 2007/166788 | | 5/2006 |
| SG | 2007/166796 | | 5/2006 |
| SG | 2007/166804 | | 5/2006 |
| SG | 2007/166812 | | 5/2006 |
| WO | WO-2001/052166 | * | 1/2000 |
| WO | 2001/022339 | | 3/2001 |
| WO | 01/52166 | | 7/2001 |
| WO | 2001/052166 | | 7/2001 |
| WO | 01/75733 | | 10/2001 |
| WO | 01/90925 | | 11/2001 |
| WO | 2002/009008 | | 1/2002 |
| WO | 2004/008296 | | 1/2004 |
| WO | 2005/010790 | | 2/2005 |
| WO | 2005/036354 | | 4/2005 |
| WO | 2006/017901 | | 2/2006 |
| WO | 2006/018001 | | 2/2006 |
| WO | 2006/018307 | | 2/2006 |
| WO | 2006/121687 | | 11/2006 |
| WO | 2006/121688 | | 11/2006 |
| WO | 2006/121689 | | 11/2006 |
| WO | 2006/121691 | | 11/2006 |
| WO | 2006/121792 | | 11/2006 |
| WO | 2006/121796 | | 11/2006 |
| WO | 2006/121812 | | 11/2006 |
| WO | 2007/038084 | | 4/2007 |
| WO | 2007/038218 | | 4/2007 |
| WO | 2008/013776 | | 1/2008 |
| WO | 2008/013828 | | 1/2008 |
| WO | 2008/013916 | | 1/2008 |
| WO | 2008/013917 | | 1/2008 |
| WO | 2008/024172 | | 2/2008 |
| WO | 2008/027124 | | 3/2008 |
| WO | 2008/073252 | | 6/2008 |

OTHER PUBLICATIONS

Domowitz, Ian, A Taxonomy of Automated Trade Execution Systems, Journal of International Money and Finance, (1993), 12, pp. 607-631.
International Search Report, dated Oct. 2, 2003 for SG2007166812.
International Search Report, dated Oct. 14, 2009 for SG2007166754
Response to Final, dated Oct. 19, 2009 for U.S. Appl. No. 11/416,913.
Response to Nonfinal, dated Sep. 29, 2009 for U.S. Appl. No. 11/634,020.
Nonfinal rejection, dated Aug. 17, 2009 for U.S. Appl. No. 11/416,710.
Response to Nonfinal, dated Nov. 2, 2009 for U.S. Appl. No. 11/416,710.
Response to Final, dated Oct. 7, 2009 for U.S. Appl. No. 11/416,942.
Examiner Interview Summary, dated Oct. 14, 2009 for U.S. Appl. No. 11/416,942.
Nonfinal Rejection, dated Oct. 7, 2019 for U.S. Appl. No. 11/345,421.
Response to Nonfinal, dated Nov. 4, 2009 for U.S. Appl. No. 11/416,756.
International Search Report and Written Opinion, PCT/US07/16856, dated Nov. 10, 2008.
U.S. Appl. No. 11/881,064, filed Jul. 25, 2007, Adcock et al..
International Search Report for PCT/US06/16685, dated Sep. 17, 2007.
International Preliminary Report on Patentability, PCT/US2007/016572, dated Apr. 23, 2009.
International Preliminary Report on Patentability, PCT/US2007/024921, dated Jun. 18, 2009.
Mckinnion, Julie, M., "Toldeo Ohio-Based Dana Corp, Could Lose NYSE Listing in Takeover Battle," The Blade, Aug. 3, 2003.
Young, Lee, W., International Search Report dated May 18, 2007, 4 pages.
Young, Lee, W., International Search Report dated Sep. 12, 2007, 6 pages.
Young, Lee, W., International Search Report dated Aug. 9, 2007, 6 pages.
Young, Lee, W., International Search Report dated Aug. 29, 2007, 7 pages.
International Search Report, dated Mar. 20, 2008 for PCT/US2007/016718.
U.S. Appl. No. 11/527,797, filed Sep. 27, 2006, Drake et al.
Young, Lee, W., International Search Report dated Sep. 7, 2007, 5 pages.
Young, Lee, W., International Search Report dated Sep. 29, 2007, 6 pages.
Australian Patent Office Written Opinion and Search Report, dated Dec. 1, 2008.
International Search Report, dated Jul. 2, 2008 for PCT/US2007/016572.
Australian Patent Office Written Opinion and Search Report, dated Feb. 13, 2009.
Austrian Patent Office Search Report and Written Opinion, dated Mar. 6, 2009.
Austrian Patent Office Search Report and Written Opinion, dated Mar. 13, 2009.
Notice of Allowance and Examiner's Amendment for U.S. Appl. No. 11/345,420.
Phlx Allows Floor Broker Crossing, Wall Street Letter, New York, Feb. 24, 2003, p. 1.
U.S. Appl. No. 11/416,756, filed May 3, 2006, Adcock et al.
Anonymous, Rising tide lifts all boats in institutional equities, The Investent Dealer's digest: IDD, New York, Mar. 28, 1994, vol. 60, Iss. 13, p. 16, 5 pages.
Headstrong Buys Assets of Elind Software Provider: Noticiasfinancieras, Miami Nov. 1, 2004, p. 1.
Non-Final Rejection, dated Feb. 26, 2008.
Response to Non-Final, dated Aug. 29, 2008 for U.S. Appl. No. 11/122,689.
Final Rejection, dated Nov. 18, 2008 for U.S. Appl. No. 11/122,689.
Response to Final, dated Mar. 17, 2009 for U.S. Appl. No. 11/122,689.
Examiner Interview, dated Apr. 13, 2009 for U.S. Appl. No. 11/122,689.
Non-Final Rejection, dated Apr. 27, 2009 for U.S. Appl. No. 11/122,689.
Non-Final Rejection, dated Apr. 1, 2008 for U.S. Appl. No. 11/122,679.
Response to Non-Final, dated Oct. 6, 2008 for U.S. Appl. No. 11/122,679.
Non-Final Rejection, dated Jan. 5, 2009 for U.S. Appl. No. 11/122,679.
Response to Non-Final, dated Apr. 6, 2009 for U.S. Appl. No. 11/122,679.
Examiner Interview, dated May 4, 2009 for U.S. Appl. No. 11/122,679.
Response to Non-Final, dated Jun. 17, 2009 for U.S. Appl. No. 11/122,679.
Non-Final Rejection, dated Dec. 9, 2008 for U.S. Appl. No. 11/345,420.
Response to Non-Final, dated Mar. 16, 2009 for U.S. Appl. No. 11/345,420.
Non-Final Rejection, dated Feb. 12, 2008 for U.S. Appl. No. 11/122,498.
Response to Non-Final, dated Aug. 14, 2008 for U.S. Appl. No. 11/122,498.
Final Rejection, dated Sep. 19, 2008 for U.S. Appl. No. 11/122,498.
Response to Final, dated Jan. 9, 2009 for U.S. Appl. No. 11/122,498.

(56) References Cited

OTHER PUBLICATIONS

Non-Final Rejection, dated Apr. 15, 2009 for U.S. Appl. No. 11/122,498.
Non-Final Rejection, dated Jun. 27, 2008 for U.S. Appl. No. 11/345,421.
Response to Non-Final, dated Sep. 22, 2008 for U.S. Appl. No. 11/345,421.
Final Rejection, dated Jan. 26, 2009 for U.S. Appl. No. 11/345,421.
Response to Final, dated May 22, 2009 for U.S. Appl. No. 11/345,421.
Non-Final Rejection, dated Sep. 30, 2008 for U.S. Appl. No. 11/416,942.
Response to Non-Final, dated Jan. 12, 2009 for U.S. Appl. No. 11/416,942.
Final Rejection, dated Apr. 23, 2009 for U.S. Appl. No. 11/416,942.
Non-Final Rejection, dated Apr. 4, 2008 for U.S. Appl. No. 11/416,710.
Informal Response to Non-Final, dated Aug. 4, 2008 for U.S. Appl. No. 11/416,710.
Notice to Applicant re: Informal Response to Non-Final, dated Sep. 11, 2008 for U.S. Appl. No. 11/416,710.
Response to Non-Final, dated Sep. 19, 2008 for U.S. Appl. No. 11/416,710.
Non-Final Rejection, dated Dec. 30, 2008 for U.S. Appl. No. 11/416,710.
Response to Non-Final, dated Mar. 27, 2009 for U.S. Appl. No. 11/416,710.
International Search Report, dated Sep. 18, 2008 for PCT/US2007/016856.
International Search Report, dated Sep. 5, 2008 for PCT/US2007/016857.
International Search Report, dated Nov. 10, 2008 for PCT/US2007/016856.
Restriction Requirement, dated Mar. 27, 2009 for U.S. Appl. No. 11/416,756.
Response to Non-Final, dated Apr. 27, 2009 for U.S. Appl. No. 11/416,756.
Non-Final Rejection, dated Aug. 4, 2009 for U.S. Appl. No. 11/416,756.
Non-Final Rejection, dated Sep. 3, 2008 for U.S. Appl. No. 11/416,943.
Response to Non-Final, dated Dec. 5, 2008 for U.S. Appl. No. 11/416,943.
Final Rejection, dated Mar. 17, 2009 for U.S. Appl. No. 11/416,943.
Response to Final, dated Jun. 17, 2009 for U.S. Appl. No. 11/416,943.
Non-Final Rejection, dated May 19, 2009 for U.S. Appl. No. 11/525,363.
International Search Report, dated Jun. 17, 2008 for PCT/US2006/036461.
Non-Final Rejection, dated Sep. 15, 2008 for U.S. Appl. No. 11/527,797.
Response to Non-Final, dated Dec. 15, 2008 for U.S. Appl. No. 11/527,797.
Final Rejection, dated Mar. 30, 2009 for U.S. Appl. No. 11/527,797.
Response to Final, dated May 19, 2009 for U.S. Appl. No. 11/527,797.
Non-Final Rejection, dated Nov. 12, 2008 for U.S. Appl. No. 11/634,020.
Response to Non-Final, dated Feb. 17, 2009 for U.S. Appl. No. 11/634,020.
Non-Final Rejection, dated Jun. 24, 2009 for U.S. Appl. No. 11/634,020.
International Search Report, dated May 12, 2008 for PCT/US2007/024921.
International Search Report, dated Jun. 17, 2008 for PCT/US2007/016571.
International Search Report, dated Jun. 17, 2008 for PCT/US2007/016682.
Examiner Interview Summary Record, dated Aug. 18, 2009 for U.S. Appl. No. 11/122,689.
Response to Nonfinal, dated Aug. 27, 2009 for U.S. Appl. No. 11/122,689.
Notice of Allowance, dated Aug. 21, 2009 for U.S. Appl. No. 11/122,679.
Examiner Interview Summary Record, dated Sep. 9, 2009 for U.S. Appl. No. 11/122,679.
Examiner Interview Summary Record, dated Aug. 18, 2009 for U.S. Appl. No. 11/122,498.
Response to Nonfinal, dated Sep. 15, 2009 for U.S. Appl. No. 11/122,498.
Response to Final, dated Sep. 30, 2009 for U.S. Appl. No. 11/416,942.
Examiner Interview Summary Record, dated Mar. 31, 2009 for U.S. Appl. No. 11/416,943.
Nonfinal Rejection, dated Sep. 30, 2009 for U.S. Appl. No. 11/416,943.
NASDAQ Launches Liquidity Tracker, HighBeam Research, Dec. 5, 2002.
Response to Nonfinal, dated Sep. 23, 2009 for U.S. Appl. No. 11/634,020.

\* cited by examiner

UNPRICED ORDER AUCTION AND ROUTING

BACKGROUND

Various market centers (including exchanges, alternative trading systems, and crossing networks) offer investors the opportunity to participate in scheduled auctions (or call auctions) throughout the trading day. These may be opening auctions, closing auctions, or intra-day auctions. Depending on the venue and the time of day, the auction may include limit orders, market orders, auction-only orders or any combination or limitation thereof. Regardless of the order types that participate in the different auction models, a characteristic that scheduled auctions generally share is that all orders matched in the auction execute at a single price that maximizes the quantity that can cross. Some of these auction models, however, have the significant drawback that regular trading is restricted or frozen until the auction process is conducted and completed. Historically, some market centers have imposed a "freeze time" of as much as ten minutes, during which traders are restricted in some cases from canceling or changing their orders if they are participating in the auctions. Additionally, during the actual execution of the auction, some market centers freeze their regular continuous trading order books (as well as their auction orders) for five seconds or longer, effectively halting all trading while the auction executes. Such extended freeze periods put traders at risk, as the market can move away from their prices.

One auction model includes only limit orders. When an auction consists solely of limit-priced orders, the limit prices resident on the market center typically determine the price or prices at which the auction may execute. As orders are received throughout the designated pre-auction period, the market center typically updates and disseminates an indicative match price, i.e., the anticipated auction clearing price as of that moment in time. If more than one match price is possible, then other external prices (e.g., the previous closing price) are often used as a tie-breaker for pricing the auction.

A second auction model includes both limit orders and market orders. When an auction includes both limit orders and market orders, the limit prices on the market center once again typically determine the price or prices at which the auction may execute, while the market orders add liquidity to the cross. Although market orders are unpriced by definition, they can negatively impact the auction pricing if they cause an imbalance in buy or sell interest. This model can be problematic, especially in thinly-traded issues, as outlier limit prices that are significantly away from the market price can sometimes disproportionately skew the auction price away from what the real market price should be when there is an excess of market order volume on the contra side. As a result, some market centers apply pre-established "price collars" to the indicative match price, whereby the auction is canceled if the indicative match price is outside of specific threshold parameters (e.g., more than $1.00 or 10% away from the consolidated last sale price or the previous closing price). This ensures that the auction only executes at prices within the range of where the issue generally trades.

A third auction model consists solely of market orders. When an auction consists solely of market orders, the market center excludes all limit orders from its pricing algorithm. Such auctions allow size discovery while minimizing the ability to manipulate the auction price. With the exclusion of limit orders, however, the market center must rely solely on external pricing for the auction. Some marketplaces look to the best bid and offer (BBO) on the primary listing market, i.e., the main market on which a given issue is listed. The problem with this approach is that the primary listing market center's BBO may not be the best indication of true marketplace prices, especially when liquidity is fragmented across exchanges, ECNs, and other market centers.

Accordingly, there is a need for a single-price market order auction that is protected from unusual pricing variations, even if participation in the auction is uneven, by deriving its pricing from the best prices in the entire marketplace (e.g. the National Best Bid and Offer (NBBO)), not just from fragments of the marketplace, as, for example, just from an issues' primary listed market center. There is a further need that such auction executes concurrently, but separately from the regular continuous limit order matching process. There is also a further need that such auction process does not require a halt or freeze in either the scheduled auction process or the continuous matching process.

SUMMARY

According to an aspect of the present invention, a method for crossing unpriced orders in a single-price auction in an issue on a posting market center includes providing a posting market center with an unpriced order book, specifying a time at which a scheduled auction is to execute, receiving unpriced buy and sell orders prior to the scheduled auction time and storing the received unpriced orders in the unpriced order book. It further includes, at the scheduled auction time, matching as many buy orders to sell orders as possible, retrieving an indicator external to the posting market center to establish the best prices in the entire marketplace, deriving a single auction price from the retrieved external indicator and executing trades in the issue between the matched buy and sell orders at the derived auction price. According to another aspect of the present invention, the retrieved external indicator may be a national best bid and offer quote, and the single auction price may be derived by computing the midpoint of the retrieved national best bid and offer quote. Furthermore, the posting market center may include a continuous matching process and the orders that are not matched during the unpriced order auction process may be released to the continuous matching process for execution. The continuous matching process may be set up to operate concurrently with the unpriced order auction process.

DESCRIPTION OF THE DRAWINGS

These and other features, aspects and advantages of the present invention will become better understood with regard to the following description, appended claims and accompanying drawings where:

DETAILED DESCRIPTION

Figure 1:
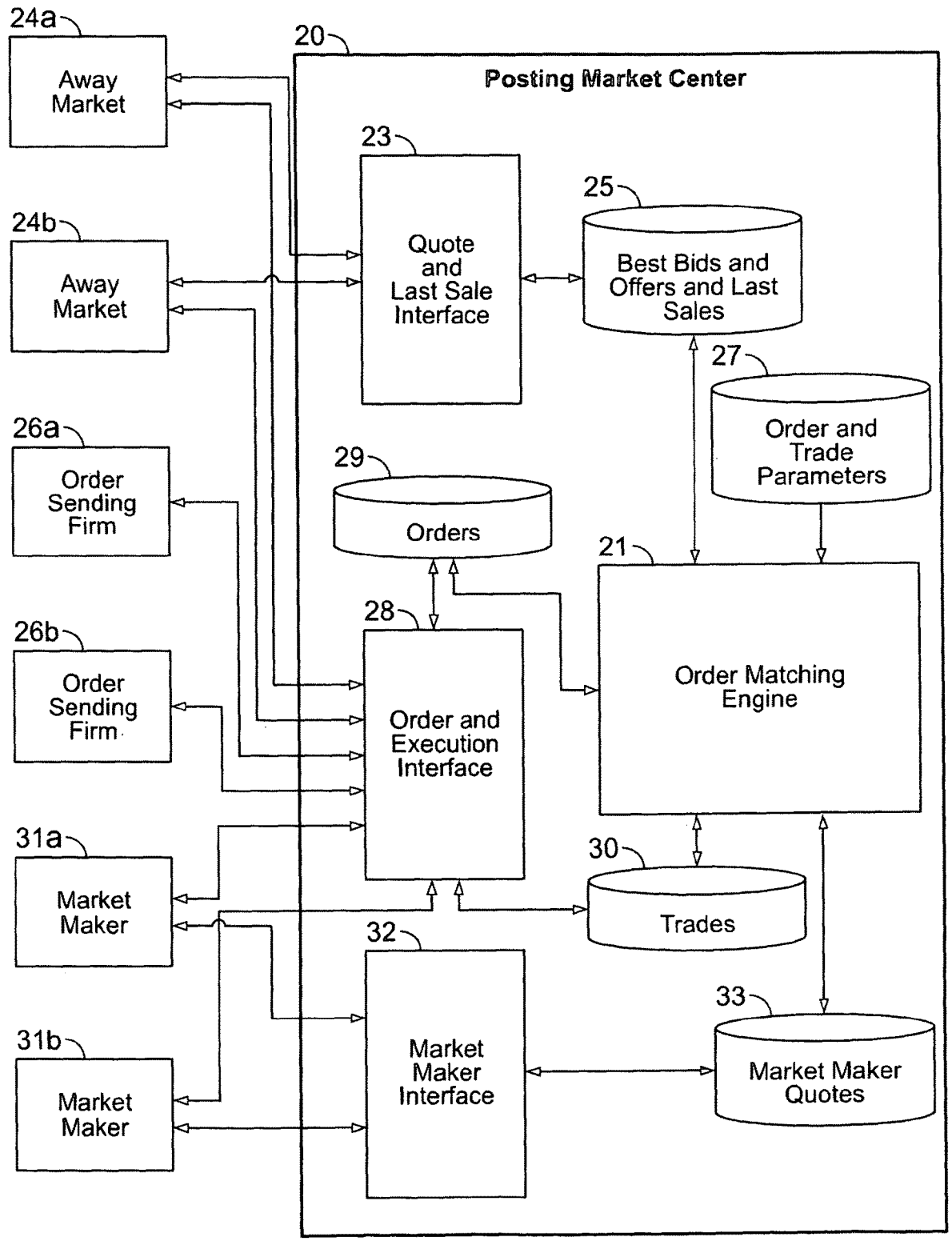
FIG. 1 is a block diagram illustrating the trading environment in which an embodiment of the present invention operates.

Referring to FIG. 1, a trading environment in which an embodiment of the system and method of the present invention operates is depicted. The examples discussed herein primarily describe the use and application of the present invention in an equity security market center environment, but it should be understood that the present invention could be used in any type of financial instrument market center environment (e.g., equities, futures, options, bonds, etc.). The trading environment of this embodiment includes a posting market center 20 which interacts with a number of other market centers 24 (i.e. away markets), traders at order sending firms 26 and Market Makers 31. It should be understood that the trading environment of this embodiment supports but does not require Market Makers 31, a Market Maker Interface 32, or Market Maker Quotes 33. It should also be understood that the posting market center 20 referred to herein refers to a computing system having sufficient processing and memory capabilities and does not refer to a specific physical location. In fact, in certain embodiments, the computing system may be distributed over several physical locations. It should also be understood that any number of traders 26 or Market Makers 31 or away market centers 24 can interact with the posting market center 20. The posting market center 20 is the market center on which a specific trader at an order sending firm 26 posts a specific order, and on which a specific Market Maker 31 posts a specific quote. The posting market center 20 includes an order matching engine 21, which validates, matches and processes all orders and quotes on the posting market center 20. In this embodiment, the code for the order matching engine 21 is stored in the posting market center's memory.

The posting market center 20 may also include a quote and last sale interface 23 that interacts with the away market centers 24 to capture quote and last sale information. This information is stored to a best bids and offers and last sales data structure 25. This data structure 25 is where the market best bid and offer information is stored. This data structure 25 is also where the market trade reports (prints) are stored. The posting market center 20 may also include an order and trade parameters data structure 27. The order and trade parameters data structure 27 stores pre-defined trading parameters and rules that are used by the order matching engine 21 in matching orders and executing trades. The posting market center 20 may also include an order and execution interface 28 which interacts with the traders 26, the Market Makers 31, the away market centers 24 and the order matching engine 21 in the order execution process. The posting market center 20 may also include an order information data structure 29 where order information is stored and a trade information data structure 30 where completed trade information is stored. The posting market center 20 may also include a Market Maker interface 32 that interacts with Market Makers 31 to capture Market Maker bids and offers in assigned issues. These bids and offers are logically depicted in a Market Maker Quotes structure 33 in this illustration. In actuality, the Market Maker bids and offers may physically reside in the away market center best bids and offers data structure 25.

Throughout the discussion herein, it should be understood that the details regarding the operating environment, data structures, and other technological elements surrounding the posting market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Order Matching Engine

Figure 2:
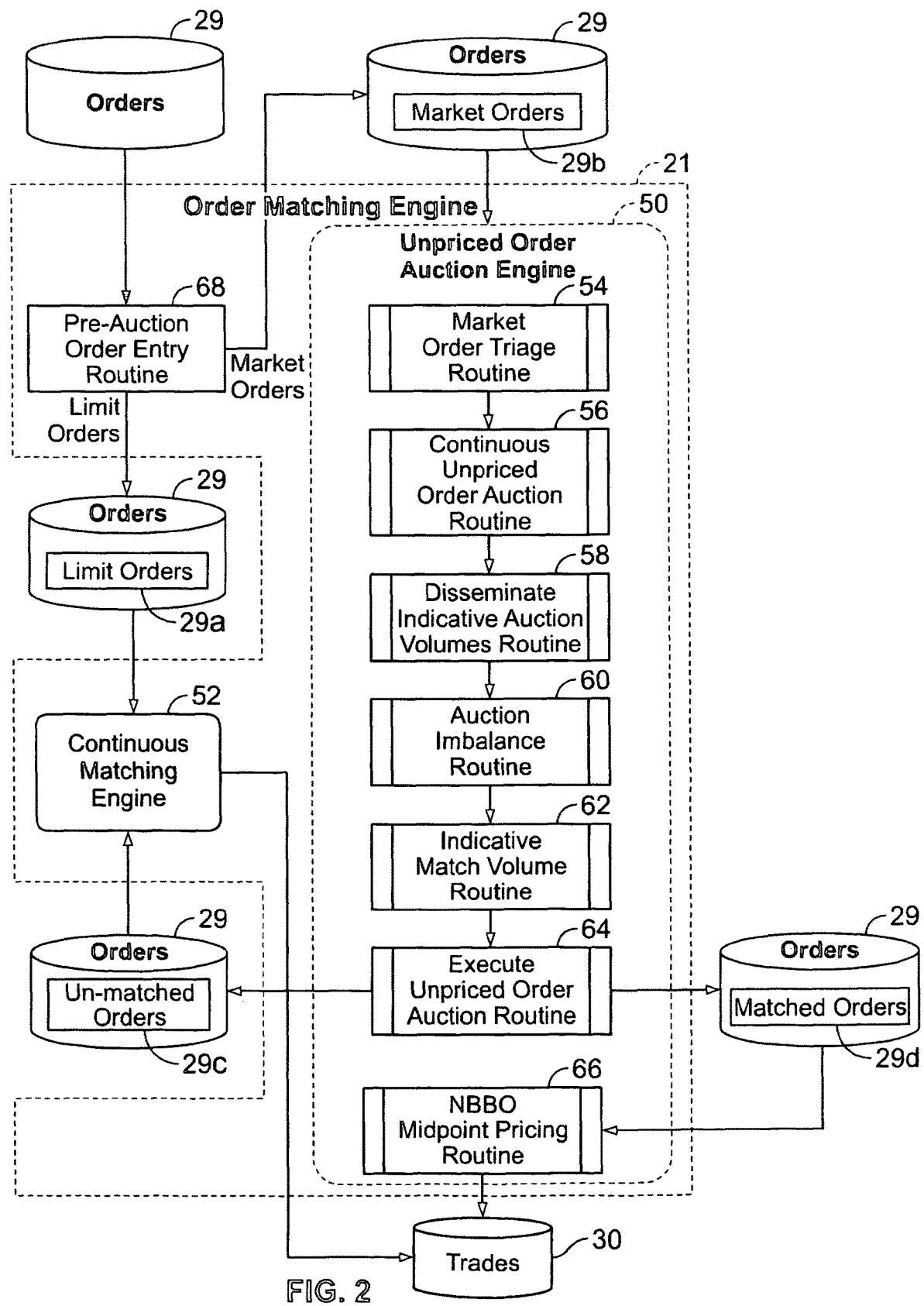
FIG. 2 is a block diagram illustrating an order matching engine in an embodiment of the present invention.

In this embodiment of the invention, the order matching engine 21 on the posting market center 20 refers to the structure and processes that implement the validation, posting, and internal matching of orders on the posting market center 20, as well as the routing of orders to away market centers 24. Referring to FIG. 2, at the heart of the order matching engine 21 is the continuous matching engine 52, which, when activated, immediately executes incoming marketable orders against the posting market center's order book in a continuous matching process. The order matching engine 21 also includes an unpriced order auction engine 50. The unpriced order auction engine 50 includes sub-routines 54-66, explained in detail below. During one or more designated market periods, the order matching engine 21 activates the unpriced order auction engine 50 and initiates the unpriced order auction process, which queues incoming market orders that are eligible to participate in an upcoming scheduled auction. The continuous matching process and the unpriced order auction process execute concurrently, but are logically separate processes from a business standpoint, as illustrated in FIGS. 2 and 3.

The Continuous Matching Process

During the pre-auction period, the pre-auction order entry routine 68, using rules stored on the data structure 27, directs incoming limit-priced orders automatically to the continuous matching engine 52 for immediate execution if possible. If an incoming limit order is not marketable, then it is included in the posting market center's order book of active limit orders 29a on data structure 29 and disseminated to the public marketplace if the order is a disclosed order type. Depending on the business rules of the posting market center 20, limit orders may also be eligible to be routed to one or more away market centers 24 during the pre-auction period before the regular trading day commences.

The Unpriced Order Auction Process

During the pre-auction period, the pre-auction order entry routine 68, using rules stored on the data structure 27, directs incoming market orders automatically to the unpriced order auction engine 50 for possible inclusion in an upcoming scheduled auction. In this embodiment, market orders eligible for the unpriced order auction are queued in a separate auction order book 29b in the data structure 29 on the posting market center 20. Although the details of the orders are not publicly displayed, a pending auction is advertised to the marketplace. As new market orders are received and existing market orders are canceled or modified during the pre-auction period, the unpriced order auction process continuously calculates and disseminates an updated Auction Imbalance parameter and Indicative Match Volume parameter. At the scheduled auction time, the unpriced order auction process executes the auction if orders exist on both sides of the auction order book and uses the first eligible NBBO quote to price the match. The matched market orders are executed, the trades are stored in data structure 30 and reported to the Tape, and the unmatched market orders, which are temporarily stored in data structure 29c, are released to the continuous matching engine 52 for execution against its order book 29a. The unpriced order auction process terminates, and all subsequent incoming market orders are automatically passed to the continuous matching engine 52.

Market Maker Quotes

The posting market center 20 may appoint Market Makers 31 in some issues. These Market Makers have a responsibility for maintaining two-sided quotes 33 in accordance with the business rules of the posting market center 20. Market Maker quotes 33 do not participate in the unpriced order auction. However, any market orders that do not match in the unpriced order auction may subsequently trade against orders generated on behalf of Market Maker quotes at the NBBO upon completion of the opening process. The unmatched market orders trade according to the normal business rules for incoming market orders, e.g., the orders may execute according to Lead Market Maker guarantee rules.

The Auction Sequence

Figure 3A:
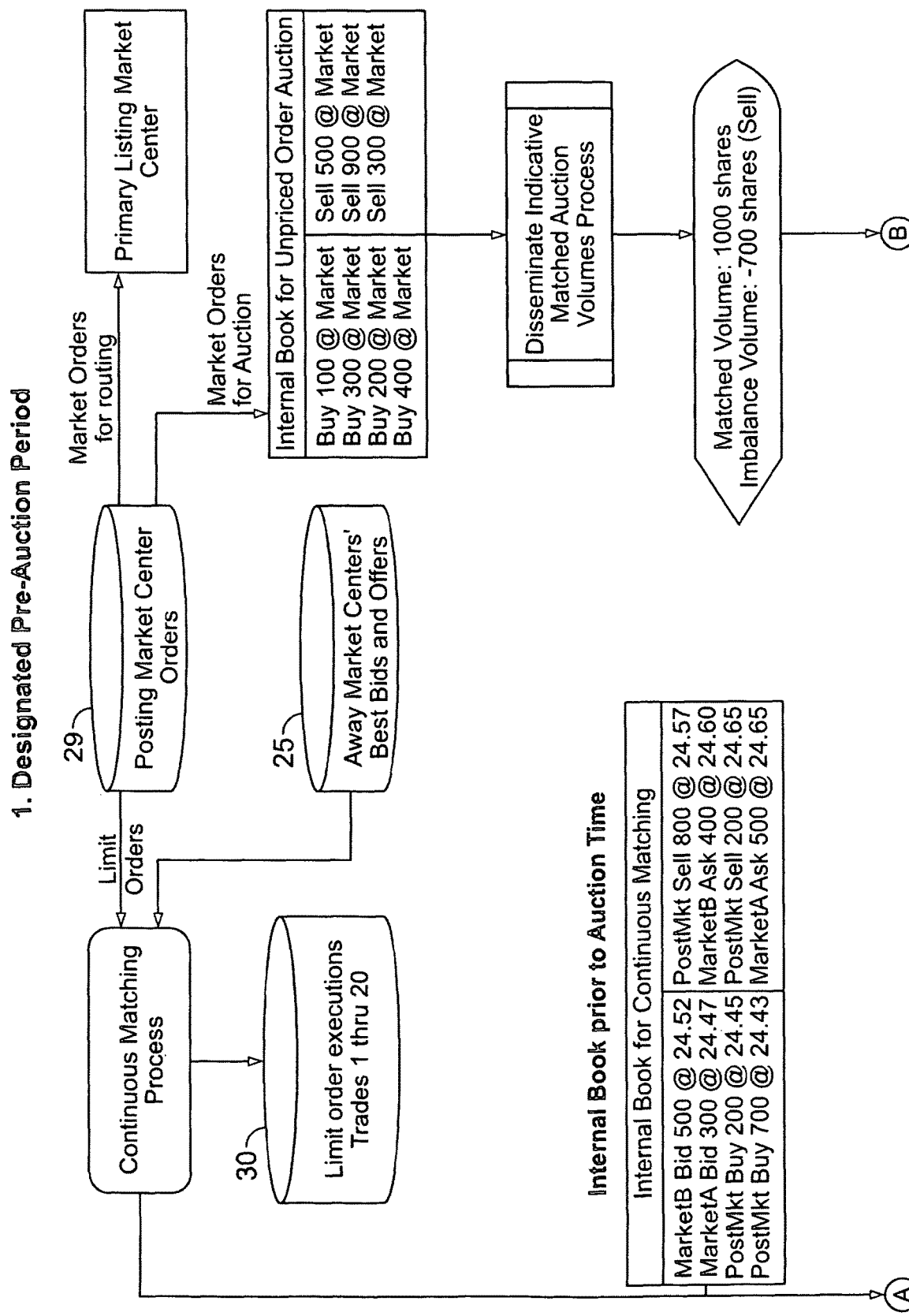
FIG. 3A and FIG. 3B show flow diagrams illustrating the stages of the auction process.
Figure 3B:
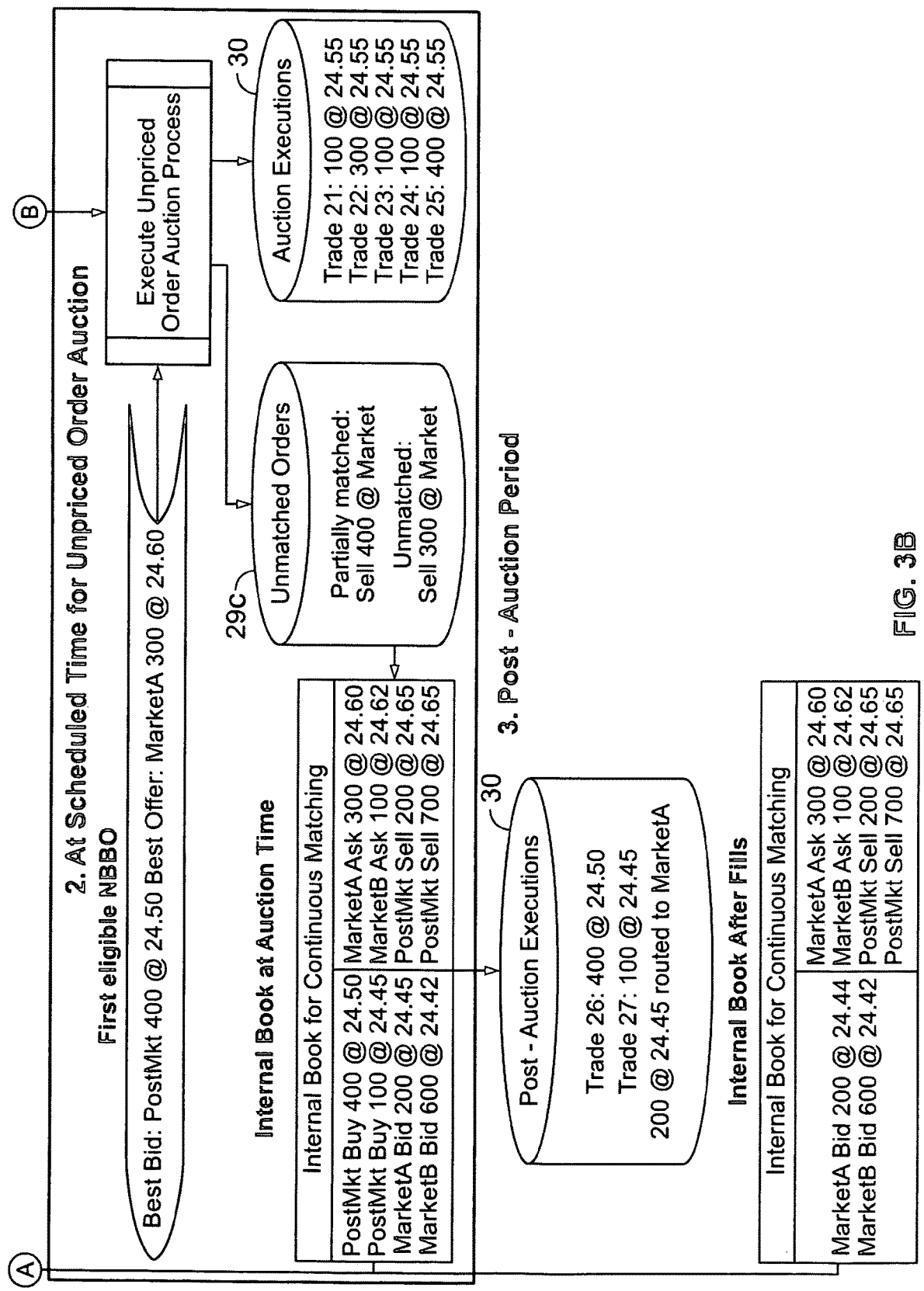

Referring to FIGS. 3A-3B, in a preferred embodiment, the unpriced order auction follows this sequence:

Pre-Auction Period
Opening
Post-Auction Period

These periods are configurable by issue according to the business rules of the posting market center 20, but generally correspond to the trading sessions in effect across the marketplace. For example, the Pre-Auction period may be configured to start at 08:00:00 am ET and end at 09:29:59 am ET, whereas the Opening is typically configured to start at 09:30:00 am ET. The Post-Auction period commences immediately upon completion of the Opening and may be configured to end at 15:59:59 pm ET by way of example.

Although this embodiment of the invention describes the unpriced order auction in the context of an Opening Auction, it should be noted that this invention could also be scheduled at different times during the trading day. In such an intra-day embodiment of the invention, only market orders designated as "Auction Only" are passed to the unpriced order auction engine 50, while regular, non-designated market orders are passed to the continuous matching engine 52 as normal. During the designated pre-auction period (e.g., with a start time of 11:30:00 am ET and an end time of 12:29:59 pm ET), the unpriced order auction process advertises the auction as described below and at the scheduled auction time (e.g., 12:30:00 pm ET) attempts to execute and price the unpriced order auction as described in detail herein.

The Pre-Auction Period

During the designated Pre-Auction period, limit orders and market orders are accepted for processing on the posting market center 20. If the primary listing market center 24 for the issue is not yet open for regular trading, then the posting market center 20 is still in the Pre-Opening period. Market Makers 31 who wish to trade on the posting market center 20 during the Pre-Opening period must do so using orders, as Market Maker quotes 33 do not trade during this period. However, Market Makers are expected to quote in their assigned issues in accordance with the business rules of the posting market center 20, in preparation for the Opening.

All incoming limit orders received during the Pre-Opening period are automatically passed to the continuous matching engine 52 where they will execute immediately if they are marketable or else are posted to the posting market center's public order book 29a if they are not marketable. Limit orders may also be eligible to be routed to superior away market centers 24 during the Pre-Opening period, as determined by the business rules of the posting market center 20.

All incoming market orders received during the Pre-Opening period are automatically passed to the unpriced order auction engine 50. If the unpriced order auction process determines that the issue is eligible for participation in the upcoming unpriced order auction, then it stores the order in time priority in the auction order book 29b for the issue. Throughout the Pre-Opening period, the unpriced order auction process continuously calculates and disseminates the Indicative Match Volume and the Auction Imbalance Volume. Traders 26 are allowed to cancel their market orders or change their size throughout the Pre-Opening period, as there is no freeze between the Pre-Opening and the Opening.

The Opening

At the scheduled Opening time, the unpriced order auction process attempts to execute an auction for each issue in which it has market orders. The completion of the unpriced order auction signals the Opening of the regular trading session on the posting market center 20. If market orders exist on both sides of the book, then the unpriced order auction is allowed to proceed. After the unpriced order auction executes and the orders are matched, the unpriced order auction process, in this embodiment, retrieves the first eligible NBBO quote published after the auction time, e.g., the first NBBO quote after 09:30:00 am ET. After the unpriced order auction process calculates and assigns an NBBO-midpoint price to the unpriced order auction, the executions are reported to the Tape with the relevant identifier (e.g., opening trade, closing trade, or regular-way trade if intra-day). Any unmatched market orders are released to the continuous matching engine 52 (unless they are designated as Auction-Only Orders, in which case they are canceled).

The Post-Auction Period

After the auction, unmatched market orders execute according to the normal business rules in effect for the processing of incoming market orders received during the regular trading day. Instead of executing at the midpoint of the NBBO, market buy orders execute at the NBO or better and market sell orders execute at the NBB or better. The unmatched market orders execute against the best contra trading interest in the marketplace, which may be a resident book order 29*a*; an order dynamically generated by the order matching engine 21 on behalf of a Market Maker quote 33; or an away market quote 25 whose price is superior to those on the posting market center 20.

Determining the Eligibility of Incoming Orders for the Unpriced Order Auction

The business rules for the posting market center 20 determine whether an issue is eligible to trade in the unpriced order auction or not. In this implementation of the present invention, eligibility is indicated by means of an unpriced order auction Participation Flag, which can be set differently for specific issues or for broader categories of issues. For example, in a preferred but not limiting embodiment of the invention, the posting market center 20 could implement business rules whereby orders in NASDAQ-listed stocks are eligible to participate in the unpriced order auction, whereas orders in NYSE-listed stocks and AMEX-listed stocks are not eligible to participate. Similarly, the posting market center 20 could implement business rules whereby orders in options whose underlying stock is listed on NASDAQ are eligible to participate in the unpriced order auction, whereas orders in options whose underlying stock is listed on the NYSE or AMEX are not eligible to participate. In a preferred embodiment, orders not eligible to participate in the unpriced order auction are instead immediately routed to the primary listing market center before it opens for trading. The primary listing market center typically queues the routed orders for its opening process. If the primary listing market center has already opened for trading (e.g., if the unpriced order auction is run intra-day instead of at the opening), then orders not eligible for the auction are generally released to the continuous matching engine 52 for immediate execution instead.

Figure 4:
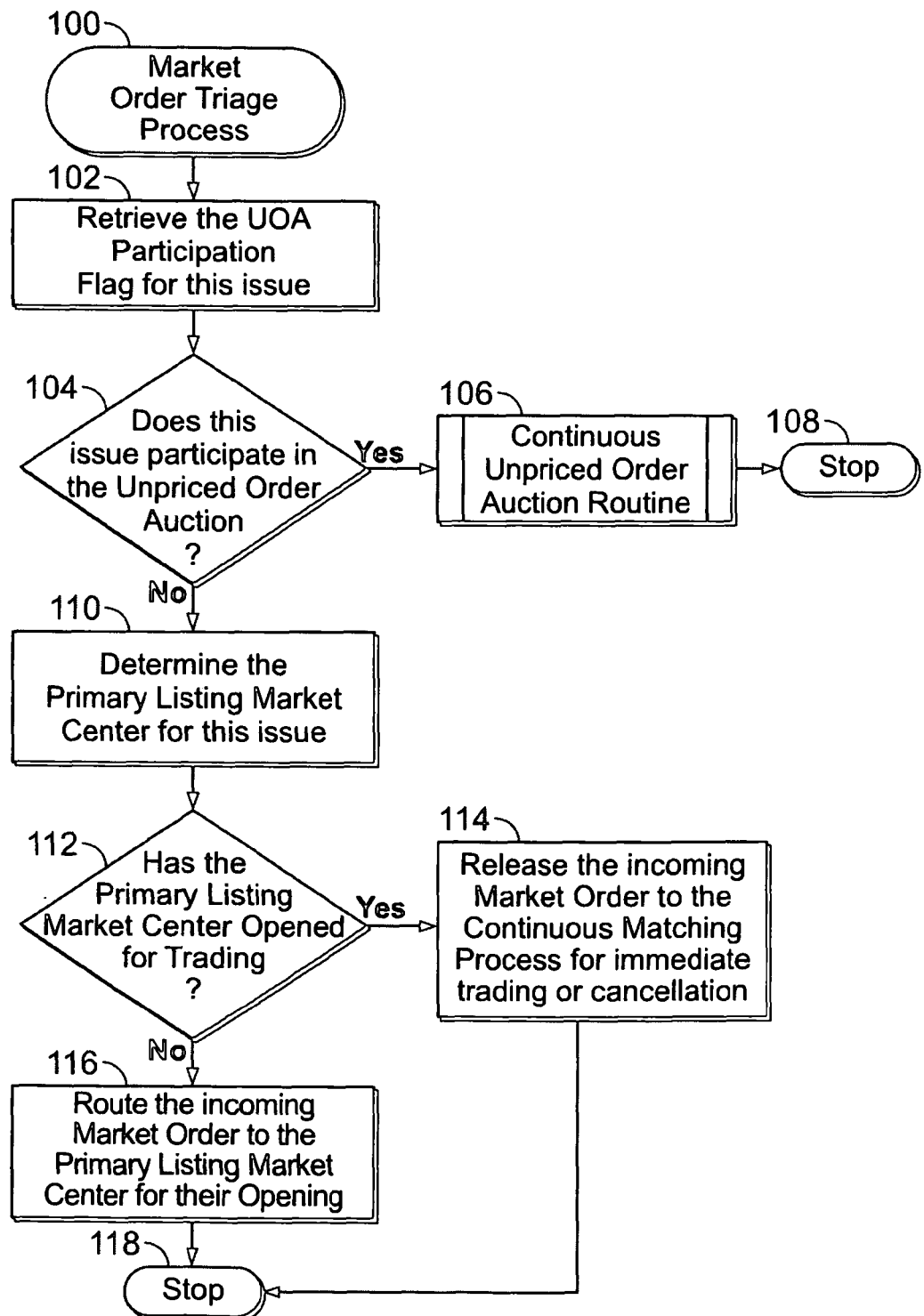
FIG. 4 is a flow diagram illustrating a process implemented by an embodiment of the present invention for determining whether an incoming market order should participate in the unpriced order auction, should be released to the continuous matching engine 52 or should be routed directly to a primary listing market center.

FIG. 4 illustrates an embodiment of the process implemented by the order matching engine 21 when a trader 26 sends a market order to the posting market center 20 during the designated pre-auction period. At step 100, a new market order is received by the Market Order Triage Routine 54, which first determines whether this issue is eligible to participate in the scheduled auction by retrieving the unpriced order auction Participation Flag for this issue in step 102. In step 104, the process checks whether the issue participates in the unpriced order auction.

If the issue does not participate in the unpriced order auction, then the process continues to step 110, where it determines the primary listing market center for the issue, i.e., the main market center where the issue is listed (e.g., away market 24*a*). (Although a given issue may trade on multiple market centers including the posting market center 20, it will only have one primary listing market center.) At step 112, the process checks if the primary listing market center is open for trading yet. If the primary listing market center is not open for trading yet, then the process continues to step 116, where it routes the market order to the primary listing market center. The routed market order will participate in the opening process of the primary listing market center instead of the opening process of the posting market center 20. The process is completed at step 118.

Returning to step 112, if the primary listing market center is already open for trading (e.g., if this is an intra-day auction and not an opening auction), then the process releases it to the continuous matching engine 52 in step 114, which either cancels the order immediately if it is an Auction-Only order or else attempts to execute the order if it is a regular market order.

Figure 5:
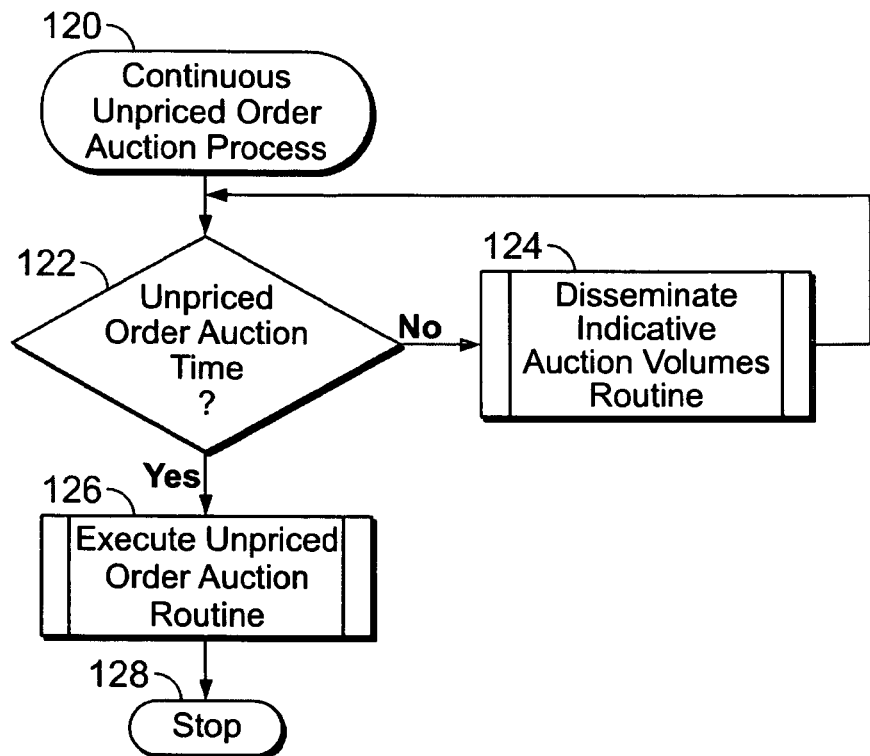
FIG. 5 is a flow diagram illustrating a process implemented by an embodiment of the present invention wherein the posting market center disseminates indicative information regarding the upcoming unpriced order auction until the scheduled auction execution time.

Returning to step 104, if the process determines that the issue is eligible to participate in the unpriced order auction, then it continues to step 106, where it invokes the Continuous Unpriced Order Auction routine 56 and proceeds to step 120 (FIG. 5).

Referring to FIG. 5, the process checks for the onset of the scheduled unpriced order auction execution time in step 122. If it is not time to execute the auction yet, then the process proceeds to step 124, where it invokes the Disseminate Indicative Auction Volumes routine 58, which includes the incoming market order in the upcoming unpriced order auction and continuously advertises the unpriced order auction up until its scheduled time. At the designated auction time, the process proceeds to step 126, where it executes the Unpriced Order Auction routine 64 and then terminates in step 128.

Figure 6:
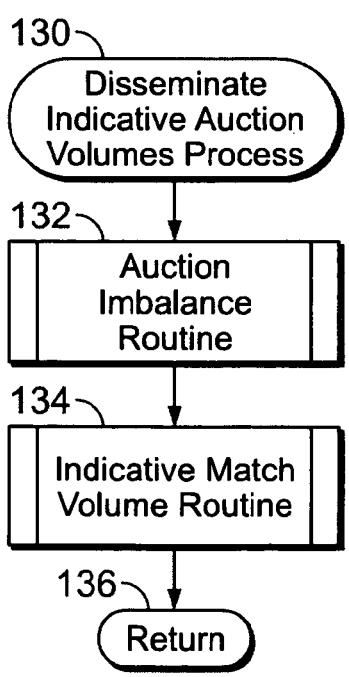
FIG. 6 is a flow diagram illustrating a process implemented by an embodiment of the present invention for disseminating an indicative unmatched volume (auction imbalance) and an indicative match volume.

Referring to FIG. 6, the unpriced order auction advertisement process includes invoking the Auction Imbalance routine 60 in step 132 and the Indicative Match Volume routine 62 in step 134. Whenever the process receives a new market order, receives a request for canceling an existing market order or receives a request to change the size of an existing market order, it recomputes the Auction Imbalance Volume and the Indicative Match Volume and disseminates the updated volumes to the marketplace in real-time. The Auction Imbalance Volume and the Indicative Match Volume are continuously displayed throughout the entire pre-auction period.

Calculating and Disseminating the Auction Imbalance and the Indicative Match Volume The posting market center 20 maintains a separate auction order book 29*b* (logically equivalent to the regular limit order book 29*a*) for each issue in which it receives one or more eligible market orders during the designated pre-auction period. Throughout the designated pre-auction period, incoming market orders are included in the auction order book 29*b* in time priority. In this embodiment, when the size of an existing market order is increased, the order loses time priority and is treated as a new order. Similarly, in this embodiment, when the size of an existing market order is decreased, the order may or may not lose time priority depending on the business rules in effect on the posting market center 20. With each new incoming order, or with each order cancellation or change of size, the unpriced order auction process recalculates the aggregate quantity of buys and sells that can presently match. This quantity is disseminated to the marketplace as the Indicative Match Volume. If interest exists on one side only, then the Indicative Match Volume is zero.

If there is an imbalance between the aggregate buy interest and the aggregate sell interest, then the unpriced order auction process calculates and disseminates the unmatched difference to the marketplace. If buy interest exceeds sell interest, then the Auction Imbalance (i.e., the unmatched quantity) is identified as a buy imbalance. If, on the other hand, the sell interest exceeds the buy interest, then the Auction Imbalance is identified as a sell imbalance. If the buy interest and sell interest are equal, then the Auction Imbalance is zero.

Examples of Advertising the Unpriced Order Auction to the Marketplace

Prior to the execution of the unpriced order auction, an issue can have

Match Volume only;
Imbalance Volume only; or
Match Volume and Imbalance Volume

Several examples illustrating how the Indicative Match Volume and the Imbalance Volume are computed are shown in the cases below.

Case 1: Matched Volume with Sell Imbalance

| | |
|---|---|
| Total volume of Market Buy orders: | 5100 shares |
| Total volume of Market Sell orders: | 6000 shares |
| Indicative Match Volume: | 5100 shares |
| Auction Imbalance: | 900 shares, Sell Imbalance |

Case 2: Matched Volume with Buy imbalance

| | |
|---|---|
| Total volume of Market Buy orders: | 1050 contracts |
| Total volume of Market Sell orders: | 720 contracts |
| Indicative Match Volume: | 720 contracts |
| Auction Imbalance: | 330 contracts, Buy Imbalance |

Case 3: Sell Imbalance only, no Matched Volume

| | |
|---|---|
| Total volume of Market Buy orders: | 0 shares |
| Total volume of Market Sell orders: | 4500 shares |
| Indicative Match Volume: | 0 shares |
| Auction Imbalance: | 4500 shares, Sell Imbalance |

Case 4: Matched Volume only, no Imbalance

| | |
|---|---|
| Total volume of Market Buy orders: | 8400 shares |
| Total volume of Market Sell orders: | 8400 shares |
| Indicative Match Volume: | 8400 shares |
| Auction Imbalance: | 0 shares |

Computing and Disseminating the Auction Imbalance

Figure 7:
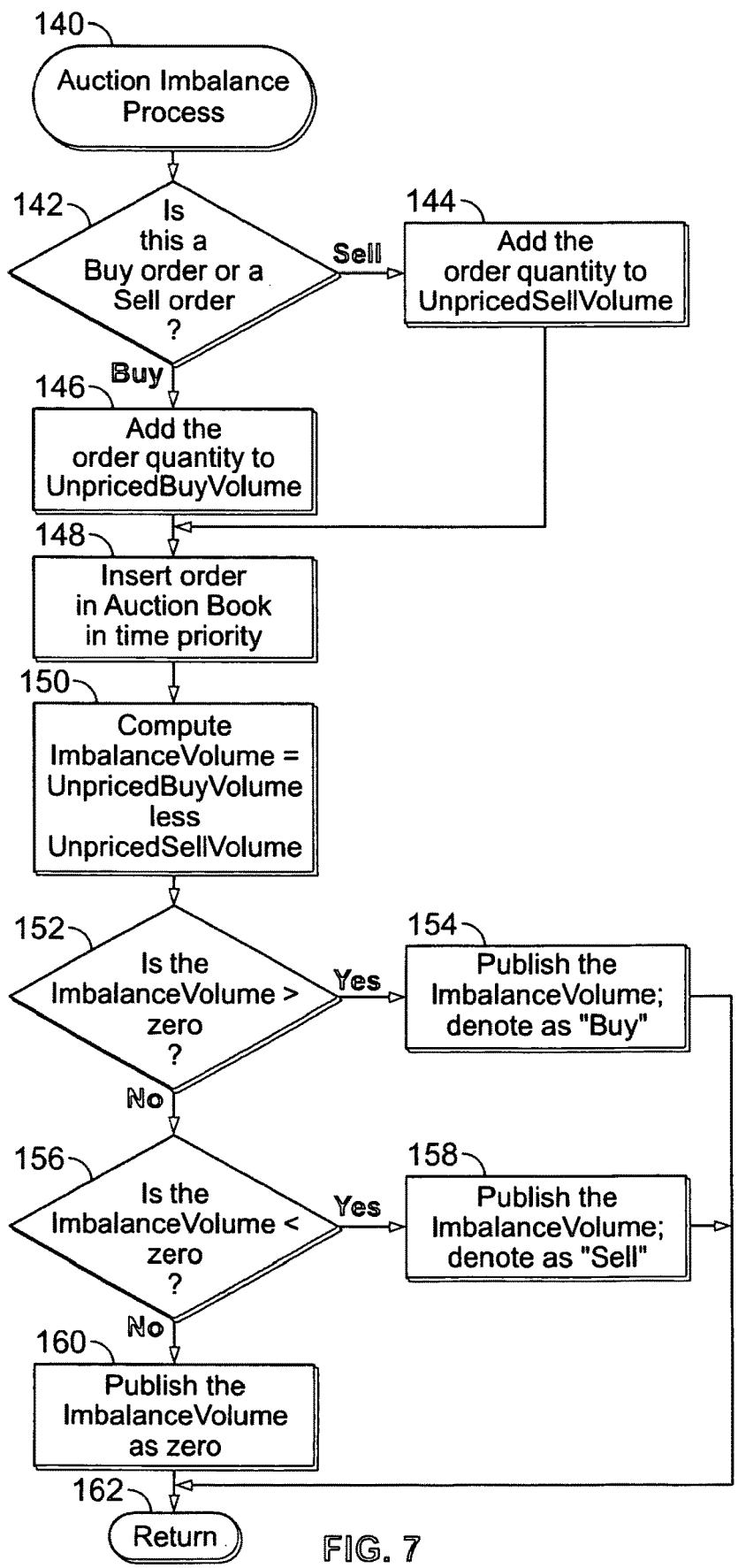
FIG. 7 is a flow diagram illustrating a process implemented by an embodiment of the present invention for storing an incoming market order in an auction book and determining whether there is an imbalance between buy interest and sell interest.

Referring to FIG. 7, the process for storing the incoming market order in the auction order book 29b and determining whether there is an Auction Imbalance, i.e., an excess of aggregate buy interest or aggregate sell interest, is illustrated. In step 142, the process checks whether the incoming market order is a buy order or a sell order. If the incoming order is a sell order, then the process continues to step 144, where it adds the quantity of the incoming market sell order to the aggregate value of the UnpricedSellVolume parameter. If, on the other hand, the incoming order is a buy order, then the process continues instead to step 146, where it adds the quantity of the incoming market buy order to the aggregate value of the UnpricedBuyVolume parameter. The UnpricedSellVolume represents the total quantity (i.e., number of shares or contracts) of market sell orders participating in the upcoming unpriced order auction, while the UnpricedBuyVolume represents the total quantity of market buy orders participating in the upcoming unpriced order auction.

In step 148, the process stores the incoming market order in time priority, with earlier orders having priority over later orders. Market buy orders are stored in time priority in the bid side of the auction order book 29b, while market sell orders are stored in time priority in the offer side of the auction order book 29b. Each issue participating in the unpriced order auction has its own auction order book.

Next, the process determines whether there is an excess of interest, i.e., an "ImbalanceVolume," on either side of the auction order book by comparing the aggregate buy volume to the aggregate sell volume. In step 150, the process computes the value of the ImbalanceVolume by subtracting the value of the UnpricedSellVolume from the value of the UnpricedBuyVolume. If at step 152 the computed ImbalanceVolume has a positive value (greater than zero), then the buy interest exceeds the sell interest, and the process continues to step 154, where it publishes the computed ImbalanceVolume to the marketplace and denotes that the excess interest is on the buy side.

Returning to step 152, if the process determines that the computed Imbalance Volume is not greater than zero, then the buy interest does not exceed the sell interest. The process continues to step 156, where it checks if the computed ImbalanceVolume is negative instead. If the ImbalanceVolume is negative (less than zero), then the sell interest exceeds the buy interest, and the process continues to step 158, where it publishes the computed ImbalanceVolume to the marketplace and denotes that the excess interest is on the sell side.

Returning to step 156, if the computed ImbalanceVolume is not negative, then the process continues to step 160. As the process has now determined that the ImbalanceVolume is neither greater than zero nor less than zero, then no imbalance exists. This means the aggregate quantity of buy interest is equal to the aggregate quantity of sell interest, and all shares (or contracts) would be matched if the unpriced order auction were to execute with the presently queued quantities. The process publishes the computed ImbalanceVolume as zero to the marketplace, and at step 162, it returns to the step where the Auction Imbalance Process was invoked, in step 132 of FIG. 6.

Computing and Disseminating the Indicative Match Volume

Figure 8:
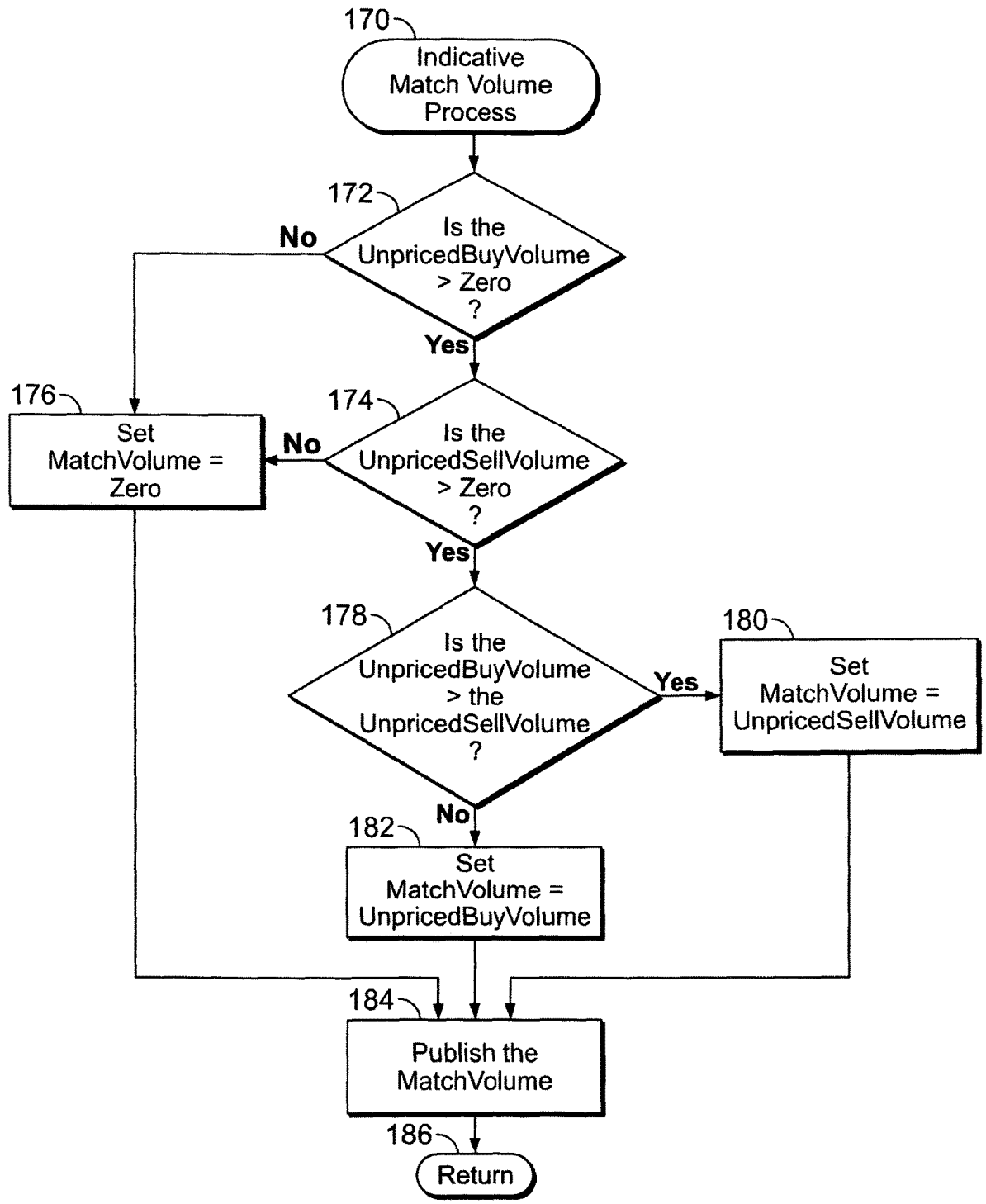
FIG. 8 is a flow diagram illustrating a process implemented by an embodiment of the present invention to determine if there is both buy interest and sell interest.

Referring to FIG. 6, the process continues to step 134, where it invokes the Indicative Match Volume routine 62 for computing and disseminating the Indicative Match Volume, i.e., the quantity of shares (or contracts) that can presently match in the upcoming unpriced order auction. Referring to FIG. 8, the process determines if orders are present on both sides of the auction order book 29b, and if a match is possible because interest exists on both sides, the process advertises the computed "MatchVolume" for the upcoming auction to the marketplace. As market orders have no prices, the Indicative Match Volume is simply the volume of buy interest that equals the sell interest, which is the lesser of the aggregate buy quantity and the aggregate sell quantity.

In step 172, the process checks whether the value of the UnpricedBuyVolume is greater than zero, i.e., if any market buy orders are present in the auction order book. If no buy orders exist, then the UnpricedBuyVolume is zero, and the process continues to step 176, where it sets the computed MatchVolume to zero because no match is possible without buy interest. The process continues to step 184, where it publishes the MatchVolume of zero to the marketplace. The process completes at step 186 as indicated.

Returning to step 172, if the UnpricedBuyVolume is greater than zero, then market buy orders exist, so the process continues to step 174 to determine if market sell orders also exist. If no sell orders exist, then the UnpricedSellVolume is zero, and the process continues to step 176, where it sets the computed MatchVolume to zero because no match is possible without sell interest. The process continues to step 184, where it publishes the MatchVolume of zero to the marketplace. The process completes at step 186 as indicated.

Returning to step 174, if the UnpricedSellVolume is also greater than zero, then interest exists on both sides of the auction order book 29b, and a match is possible to the degree to which the buys and sells overlap. The Indicative Match Volume is the lesser of the aggregate buy interest and the aggregate sell interest. In step 178, the process compares the value of the UnpricedBuyVolume to the value of the UnpricedSellVolume. If the UnpricedBuyVolume is greater than the UnpricedSellVolume, then the process sets the Indicative Match Volume ("MatchVolume") equal to the value of the UnpricedSellVolume in step 180. If, on the other hand, the UnpricedBuyVolume is not greater than the UnpricedSellVolume, then the process sets the MatchVolume equal to the value of the UnpricedBuyVolume in step 182. In step 184, the process publishes the computed MatchVolume to the marketplace, and the process completes at step 186.

Executing the Unpriced Order Auction at its Scheduled Time

At a configurable, pre-determined scheduled auction time parameter stored in data structure 27, the unpriced order auction process attempts to execute an unpriced order auction for each issue in which it has market orders queued in the auction order book. If interest exists on one side of the book only, i.e., buys but not sells (or sells but not buys), then no match is possible and the auction is canceled. The unmatched market orders are immediately released to the continuous matching engine 52 for execution in the regular trading session.

If interest exists on both sides of the book, then orders can match in the auction. The unpriced order auction process determines the quantity that can match, i.e., the lesser of the aggregate buy volume and the aggregate sell volume. Buy orders are paired with sell orders up to the computed MatchVolume, in accordance with time priority (i.e., earlier orders are paired before later orders). After the buy orders and sell orders have been paired, the unpriced order auction, in this embodiment, retrieves the NBBO quote for the issue. If the auction is an opening auction, then the first NBBO quote published after 09:30 am T is retrieved. In a different implementation of this invention, if the auction is an intraday auction, then the first NBBO quote after the designated auction time (e.g., 12:30 pm ET) is retrieved instead.

When the NBBO quote is retrieved, the unpriced order auction process evaluates whether the disseminated NBBO is eligible to price the auction. If the NBBO is neither locked nor crossed (i.e., the NBB is not higher than the NBO, nor is it equal to the NBO), then the unpriced order auction process calculates the midpoint of the NBBO quote. If the spread between the NBB and the NBO is one price increment, then the auction is priced at the midpoint of the increment, even though customers are not allowed to send limit orders at those increments. For example, if the NBBO is $20.00 to $20.01 for an issue trading in pennies, then the auction is priced at $20.005 even if subpenny trading is not allowed.

If the NBBO is crossed, then the unpriced order auction process discards the crossed NBBO quote and waits for the next uncrossed NBBO quote to be disseminated. If the NBBO is locked, the business rules of the posting market center 20 must be consulted. In one implementation of the invention, the auction is priced at the NBBO even if the market is locked. For example, if the NBBO is $20.00 to $20.00, then the auction is priced at $20.00. In a different implementation of the invention, the unpriced order auction process discards the locked NBBO and waits for the next uncrossed, unlocked NBBO. The business rules may differ depending on whether the posting market center 20 is a party to the lock or not.

If no eligible NBBO quote is received within a reasonable period of time after 09:30 am ET as determined by the business rules of the posting market center 20, then the unpriced order auction is typically canceled manually by the Trading Desk, and regular trading commences when the issue (or the underlying stock, in the case of equity options) opens on the primary listing market center.

Figure 9:
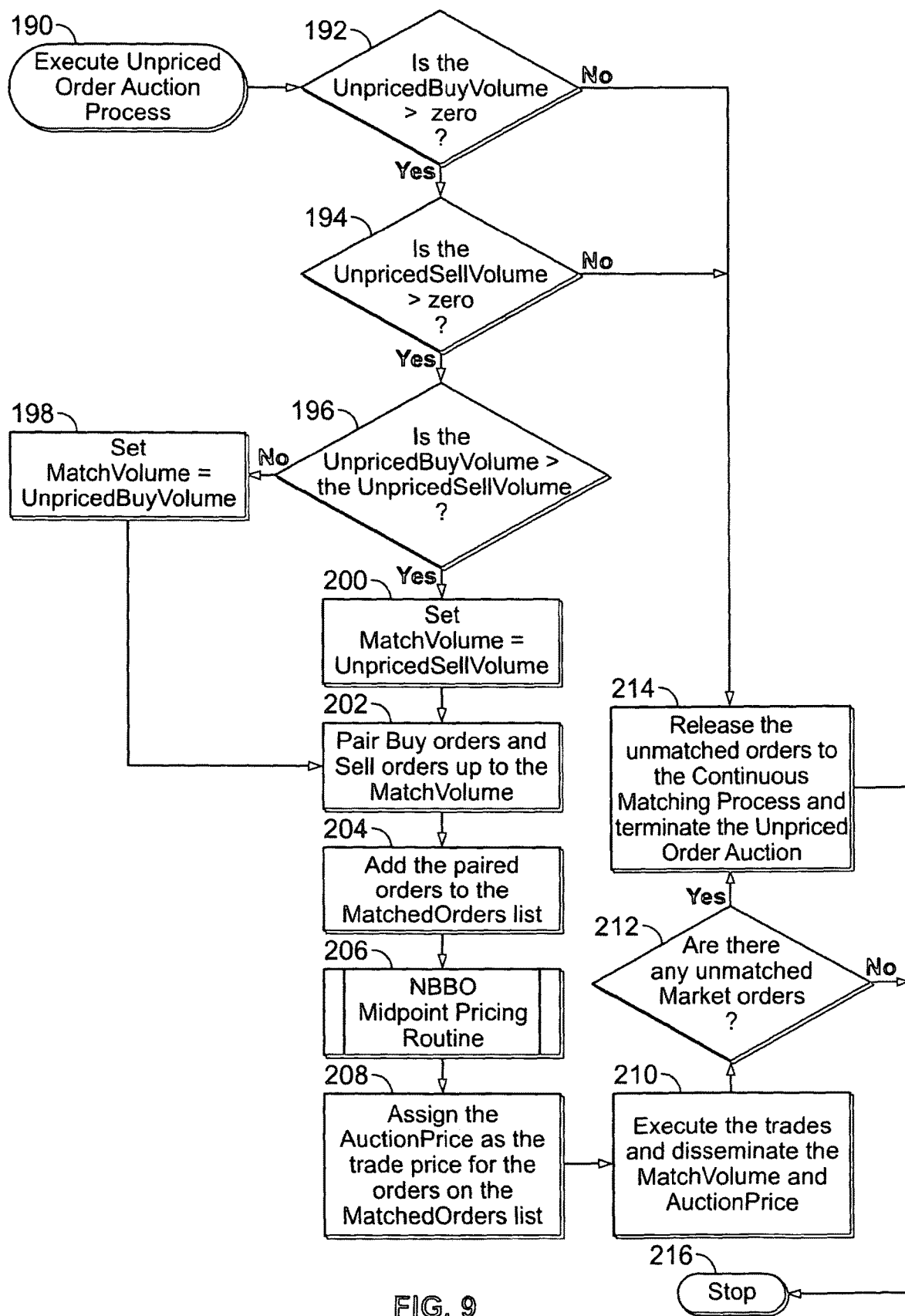
FIG. 9 is a flow diagram illustrating a process implemented by an embodiment of the present invention to execute the unpriced order auction if there is both buy interest and sell interest and to release any unmatched orders for regular trading.

FIG. 9 illustrates how the process determines whether it should execute or cancel the unpriced order auction at its scheduled auction time, and the method whereby the queued market orders are matched in the unpriced order auction and/or released from the process. If an issue has interest on both sides of the auction order book, then the process executes the unpriced order auction and releases any unmatched market orders. If an issue has interest on one side only of the auction order book, then the process cancels the unpriced order auction and releases all the queued market orders.

In step 192, the process determines if market buy orders exist by checking if the value of the UnpricedBuyVolume is greater than zero. If the UnpricedBuyVolume is not greater than zero, then no buy interest exists for this issue, and the process proceeds to step 214, where it releases the unmatched market orders (Sell Orders, in this case) to the continuous matching engine 52 and cancels the unpriced order auction. (If a market sell order has been designated as Auction-Only, then it is automatically canceled as well.) The process then stops at step 216 as indicated, and the normal trading session commences when this issue opens.

Returning to step 192, if the UnpricedBuyVolume is greater than zero, then buy interest does exist for this issue, and the process continues to step 194, where it determines if market sell orders also exist. If the UnpricedSellVolume is not greater than zero, then no sell interest exists for this issue, and the process proceeds to step 214, where it releases the unmatched market orders (buy orders, in this case) to the continuous matching engine 52 and cancels the unpriced order auction. (If a market buy order has been designated as Auction-Only, then it is automatically canceled as well.) The process then stops at step 216 as indicated, and the normal trading session commences when this issue opens.

Returning to step 194, if the UnpricedSellVolume is greater than zero, then sell interest does exist for this issue, and the process can execute the unpriced order auction. To determine the volume that can match in the unpriced order auction, the process sets the matchable quantity (MatchVolume) to the lesser of the aggregate market buy order volume and the aggregate market sell order volume. In step 196, the process compares the UnpricedBuyVolume to the UnpricedSellVolume. If the UnpricedBuyVolume is greater than the UnpricedSellVolume, then the process continues to step 200, where it sets the value of the MatchVolume equal to the value of the UnpricedSellVolume. Returning to step 196, if, on the other hand, the UnpricedBuyVolume is not greater than the UnpricedSellVolume, then the process continues to step 198, where it sets the value of the MatchVolume equal to the value of the UnpricedBuyVolume.

Having determined the MatchVolume, the process continues to step 202, where it matches the market buy orders and the market sell orders up to the computed MatchVolume. The orders are paired according to time priority, with the oldest orders matching prior to the newest orders. Depending on the value of the MatchVolume, it is possible that the last participating buy order or sell order is only partially matched in the unpriced order auction. After pairing the eligible market buy orders and market sell orders, the process momentarily adds them to a "MatchedOrders" data structure 29d in step 204, where the trades await pricing.

Pricing the Unpriced Order Auction at the Midpoint of the NBBO Quote

Figure 10:
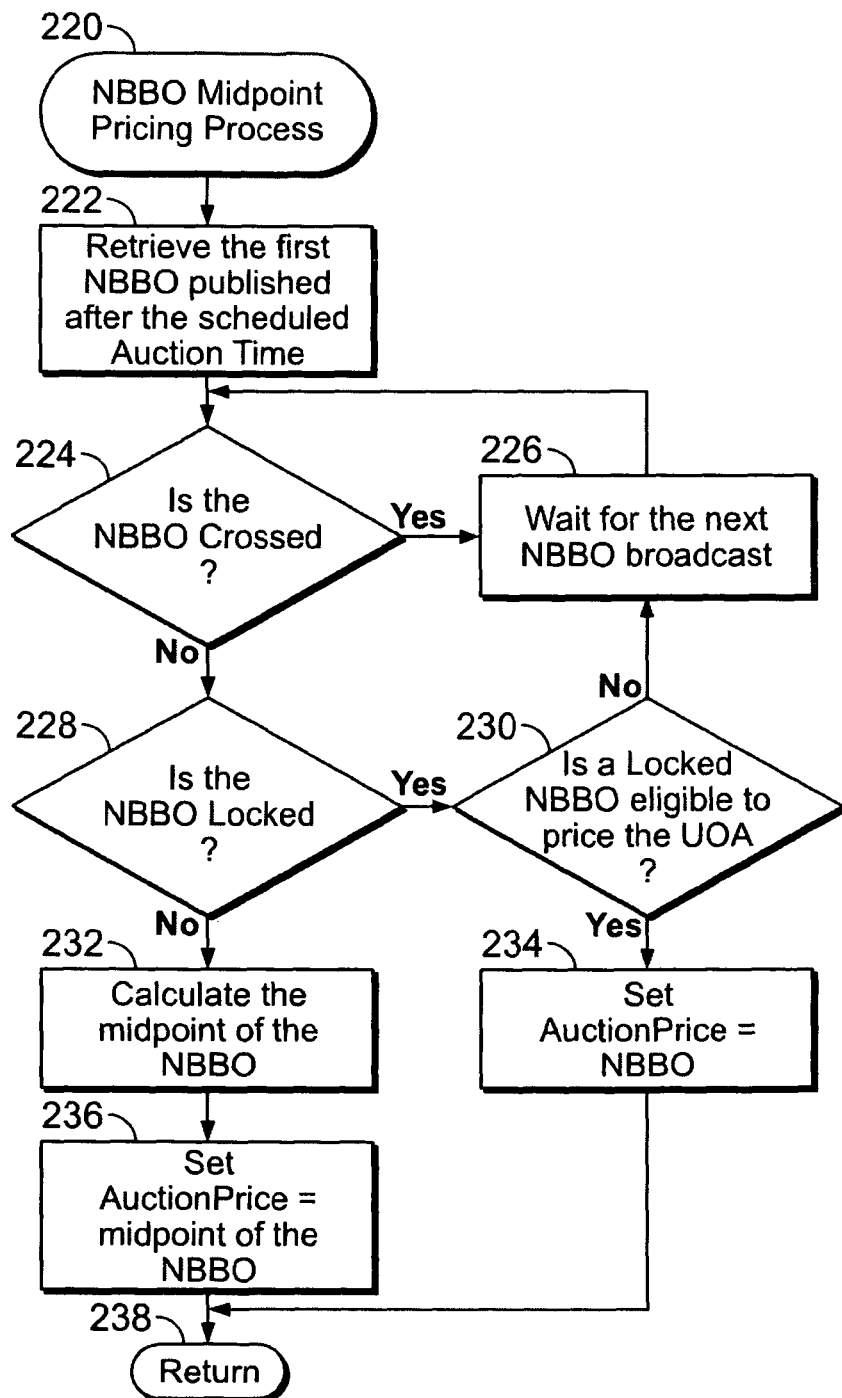
FIG. 10 is a flow diagram illustrating a process implemented by an embodiment of the present invention to price the orders matched in the unpriced order auction based on the NBBO quote price.

After the process has paired the eligible market buy orders and market sell orders, in this embodiment, it must determine the NBBO midpoint price at which the orders will execute, as indicated at step 206. FIG. 10 illustrates the process for computing the price of the auction. Referring to FIG. 10, the process retrieves the first NBBO quote published after the scheduled auction time and evaluates its eligibility in pricing the unpriced order auction. If the process determines the currently-evaluated NBBO quote to be ineligible, then it discards it and waits for the next NBBO quote, until it finally determines that the NBBO quote is indeed eligible to price the unpriced order auction.

In step 222, the process retrieves the first published NBBO quote after the scheduled auction time, e.g., after 09:30 am ET if this is an opening auction. In step 224, the process checks whether the NBBO is crossed, i.e., if the NBB is higher than the NBO. If the NBBO is crossed, then the process continues to step 226, where it waits for the next published NBBO quote.

Returning to step 224, if the NBBO is not crossed, then the process continues to step 228, where it checks whether the NBBO is locked, i.e., if the NBB is equal to the NBO. In the preferred embodiment of this invention, a locked NBBO is permitted to price the unpriced order auction according to the business rules of the posting market center 20. However, in a different embodiment of this invention, a locked NBBO may not be permitted to price the unpriced order auction, in which case the process must wait for the next uncrossed, unlocked NBBO. If the NBBO is locked, then the process proceeds to step 230, where it checks whether a locked NBBO can price the unpriced order auction according to the business rules of the posting market center 20. If a locked NBBO cannot price the unpriced order auction, then the process discards the currently evaluated NBBO and continues to step 226 to wait for the next NBBO quote. If, however, a locked NBBO can price the unpriced order auction, then the process continues to step 234, where it sets the price of the unpriced order auction (the "AuctionPrice") equal to the locked NBBO price and proceeds to step 238, where the process returns to where it was invoked in FIG. 9 (step 206).

Returning to step 228, if, however, the NBBO is not locked, then the process calculates the midpoint of the NBBO quote in step 232. As previously described, if the difference between the NBB and the NBO is one price increment, then the midpoint of the price increment is computed, even though such increment is not valid in the continuous matching engine 52. Having computed the midpoint of the uncrossed, unlocked NBBO quote, the process continues to step 236, where it sets the AuctionPrice equal to the computed midpoint price and proceeds to step 238, where the process returns to where it was invoked in FIG. 9 (step 206).

Completing the Unpriced Order Auction after the Midpoint Price has been Determined After the process has determined the match price for the unpriced order auction, it continues to step 208, where it assigns the AuctionPrice as the trade price for all the market orders stored on the MatchedOrders data structure 29d. In step 210, the process executes the trades and disseminates the MatchVolume and the AuctionPrice to the marketplace.

In step 212, the process checks whether there are any remaining market buy orders or market sell orders that were not matched in the unpriced order auction. If there are no unmatched market orders, then the process stops at step 216. However, if any unmatched market orders exist, then the process continues to step 214, where it releases the unmatched market orders to the continuous matching engine 52 (unless an order has been designated as Auction-Only, in which case it is canceled instead.) The process then stops at step 216 as indicated. It should be understood that in another embodiment the unmatched market orders could be released to the continuous matching engine 52 immediately after the matching of the market orders in step 202, prior to the pricing and execution of the matched orders.

At step 216, the unpriced order auction process is complete, and all subsequent incoming market orders are passed to the continuous matching engine 52.

Examples of how market orders participate in the unpriced order auction are provided below. Most of the examples use equity securities as their basis, although several examples use equity options as their basis. The invention is equally applicable to other financial instruments as well. It should be understood that the order prices and market prices discussed in these examples are by way of example only to illustrate how the process of an embodiment of the invention handles unpriced order auctions when executed at the Opening.

Example 1: Market Buy Order is Received for an Issue that does not Participate in the Unpriced Order Auction During the designated Pre-Auction period (which in this example occurs before the national markets open for the regular trading session at 09:30 am ET), the posting market center 20 receives the following order in step 100:

Order A: Buy 200 @ Market

Referring to FIG. 4, when the process receives an incoming market order, it must determine whether the issue is eligible to participate in the upcoming unpriced order auction or not. In step 102, the process retrieves the unpriced order auction Participation Flag for this issue and checks whether the issue is eligible to participate in the unpriced order auction in step 104. In this example, the unpriced order auction Participation Flag is set to "No," indicating that the issue is not eligible to participate in the unpriced order auction.

Upon determining that the issue is not eligible for the unpriced order auction, the process proceeds to step 110, where it determines the primary listing market center for the issue. In this example, the primary listing market center for this issue is Away Market Center A, 24a. In step 112, the process determines that Away Market Center A is not open for trading yet, so it continues to step 116, where it routes incoming Order A to Away Market Center A. Order A may participate in the opening of Away Market Center A 24a, but will not participate in the opening of the posting market center 20. The process stops as indicated at step 118.

Example 2: Market Buy Order is Received for an Issue that Participates in the Unpriced Order, Auction During the designated Pre-Auction period, the posting market center 20 receives the following order in step 100:

Order B: Buy 600 @ Market

As in the prior example, the process must determine whether the issue is eligible to participate in the upcoming unpriced order auction or not. In step 102, the process retrieves the unpriced order auction Participation Flag for this issue and checks whether the issue is eligible to participate in the unpriced order auction in step 104. In this example, the unpriced order auction Participation Flag is set to "Yes," indicating that the issue is indeed eligible to participate.

Upon determining that the issue is eligible for the unpriced order auction, the process continues to step 106, where it invokes the Continuous Unpriced Order Auction routine 56. As illustrated in FIG. 5, the invoked process checks for the onset of the scheduled auction time in step 122. As the scheduled auction time is still pending in this example, the process continues to step 124, where it invokes the routines that advertise the upcoming unpriced order auction to the marketplace. As illustrated in FIG. 6, the two invoked routines that advertise the upcoming auction are the Auction Imbalance routine 60 invoked at step 132 and the Indicative Match Volume routine 62 invoked at step 134.

Incoming Market Buy Order B is presented to the Auction Imbalance routine 60, as illustrated in FIG. 7. In step 142, the process determines that incoming Market Order B is a buy order, and therefore adds the order quantity (600 shares) to the aggregate buy interest, whose quantity is reflected in the UnpricedBuyVolume. As Order B is the first market order received for this issue, the UnpricedBuyVolume is presently set to zero. At step 146, the process adds the quantity of incoming Order B (600) to the UnpricedBuyVolume (zero) to derive the updated UnpricedBuyVolume=600 shares.

In step 148, the process inserts Order B in the auction order book, in time priority. The auction order book looks like this:

| Bids | Offers |
|---|---|
| Order B: Buy 600 @ Market | |

In step 150, the process computes the Auction Imbalance, which is the excess of buy interest over sell interest, or vice versa. The process computes the ImbalanceVolume by subtracting the UnpricedSellVolume from the UnpricedBuyVolume. As no Sell Orders have been received yet for this issue, the UnpricedSellVolume is presently set to zero. The process therefore computes the ImbalanceVolume as +600 shares (600 less zero).

In step 152, the process checks whether the computed ImbalanceVolume (+600) is greater than zero. As the ImbalanceVolume is greater than zero, the process continues to step 154, where it publishes the ImbalanceVolume and denotes it as an excess of interest on the buy side. For example, in this implementation of the invention, the process publishes "Imbalance Volume: +600 Buy Imbalance" to the marketplace. In step 162, the process then returns, and continues to step 134 (FIG. 6), where the Indicative Match Volume routine 62 is invoked next. As illustrated in FIG. 8, the process for the invoked Indicative Match Volume routine 62 determines the volume that can match in the upcoming unpriced order auction and advertises the matched quantity, if any, to the marketplace.

In step 172, the process checks whether the UnpricedBuyVolume is greater than zero. In this example, the UnpricedBuyVolume=600, so the process continues to step 174, where it checks whether the UnpricedSellVolume is also greater than zero. As no Sell Orders have been received yet and the UnpricedSellVolume=zero, no match is possible. The process continues to step 176, where it sets the MatchVolume=zero. In step 184, the process publishes the MatchVolume. The advertised auction looks like this:

| Symbol | Auction Imbalance | Indicative Match Volume | Match Price |
|---|---|---|---|
| XYZZ | +600 Buy | 0 | |

Example 3: Market Buy Order Increases the Auction Imbalance

During the designated Pre-Auction period, the posting market center 20 receives the following order in step 100:

Order C: Buy 400 @ Market

In this example, Order C is processed much like Order B, as it is a market order in the same issue. The process determines the issue is eligible to participate in the unpriced order auction, determines that the scheduled time has not commenced yet (steps 102, 104, 106, 120, 122, and 124), and proceeds to step 140, where the incoming market buy order is presented to the Auction Imbalance routine 60.

In step 142, the process determines that incoming Market Order C is a buy order and continues to step 146. At step 146, the process adds the quantity of incoming Order C (400) to the UnpricedBuyVolume (600) to derive the updated UnpricedBuyVolume=1000 shares.

In step 148, the process inserts Order C in the auction order book, in time priority behind Order B. The auction order book looks like this:

| Bids | Offers |
|---|---|
| Order B: Buy 600 @ Market | |
| Order C: Buy 400 @ Market ← | |

In step 150, the process computes the Auction Imbalance by subtracting the UnpricedSellVolume from the UnpricedBuyVolume. As no Sell Orders have been received yet for this issue, the UnpricedSellVolume is presently set to zero. The process therefore computes the ImbalanceVolume as +1000 shares (1000 less zero).

In step 152, the process checks whether the computed ImbalanceVolume (+1000) is greater than zero. As the ImbalanceVolume is greater than zero, the process continues to step 154, where it publishes the ImbalanceVolume and denotes it as an excess of interest on the buy side. For example, in this implementation of the invention, the process publishes "Imbalance Volume: +1000 Buy Imbalance" to the marketplace. In step 162, the process then returns, and continues to step 134 (FIG. 6), where the Indicative Match Volume routine 62 is invoked next.

Referring to FIG. 8, in step 172, the invoked process checks whether the UnpricedBuyVolume is greater than zero. In this example, the UnpricedBuyVolume=1000, so the process continues to step 174, where it checks whether the UnpricedSellVolume is also greater than zero. As no sell orders have been received yet and the UnpricedSellVolume=zero, no match is possible. The process continues to step 176, where it sets the MatchVolume=zero. In step 184, the process publishes the MatchVolume. The advertised auction look like this:

| Symbol | Auction Imbalance | Indicative Match Volume | Match Price |
|---|---|---|---|
| XYZZ | +1000 Buy | 0 | |

Example 4: Market Sell Order Results in a Matched Volume and Creates a Sell Imbalance During the designated Pre-Auction period, the posting market center 20 receives the following order in step 100:

Order D: Sell 1500 @ Market

In this example, Order D is processed initially like Orders B and C, as it is a market order in the same issue. The process determines the issue is eligible to participate in the unpriced order auction, determines that the scheduled time has not commenced yet (steps 102, 104, 106, 120, 122, and 124), and proceeds to step 140, where the incoming market sell order is presented to the Auction Imbalance routine 60.

In step 142, the process determines that incoming Market Order D is a sell order, and therefore adds the order quantity (1500 shares) to the aggregate sell interest, whose quantity is reflected in the UnpricedSellVolume. As Order D is the first market sell order, the UnpricedSellVolume is presently set to zero. At step 144, the process adds the quantity of incoming Order D (1500) to the UnpricedSellVolume (zero) to derive the updated UnpricedSellVolume=1500 shares.

In step 148, the process inserts Order D in the auction order book, in time priority. The auction order book looks like this:

| Bids | Offers |
|---|---|
| Order B: Buy 600 @ Market | Order D: Sell 1500 @ Market ← |
| Order C: Buy 400 @ Market | |

In step 150, the process computes the Auction Imbalance by subtracting the UnpricedSellVolume (1500) from the UnpricedBuyVolume (1000) to derive an updated ImbalanceVolume=−500.

In step 152, the process then checks whether the computed ImbalanceVolume (−500) is greater than zero. As the ImbalanceVolume is not greater than zero (it is actually less than zero), the process continues to step 156, where it checks if it is less than zero. As the ImbalanceVolume is less than zero, the process continues to step 158, where it publishes the ImbalanceVolume and denotes it as an excess of interest on the sell side. In step 162, the process then returns, and continues to step 134 (FIG. 6), where the Indicative Match Volume routine 62 is invoked next.

In step 172, the invoked process checks whether the UnpricedBuyVolume is greater than zero. In this example, the UnpricedBuyVolume=1000, so the process continues to step 174, where it checks whether the UnpricedSellVolume is also greater than zero. As the UnpricedSellVolume=1500, orders can match in the upcoming unpriced order auction. To determine the quantity that can match in the unpriced order auction, the process continues to step 178, where it checks whether the UnpricedBuyVolume (1000) is greater than the UnpricedSellVolume (1500). As the UnpricedBuyVolume is lower, the process continues to step 182, where it sets the MatchVolume=1000 shares, the value of the UnpricedBuyVolume. In step 184, the process publishes the MatchVolume to the marketplace. The advertised auction looks like this:

| Symbol | Auction Imbalance | Indicative Match Volume | Match Price |
|---|---|---|---|
| XYZZ | −500 Sell | 1000 | |

Example 5: Market Buy Order Increases the Matched Volume and Creates a Buy Imbalance During the designated Pre-Auction period, the posting market center 20 receives the following order in step 100:
Order E: Buy 2000 @ Market In this example, Order E is processed initially like Orders B, C, and D, as it is a market order in the same issue. The process determines the issue is eligible to participate in the unpriced order auction, determines that the scheduled time has not commenced yet (steps 102, 104, 106, 120, 122, and 124), and proceeds to step 140, where the incoming market buy order is presented to the Auction Imbalance routine 60.

In step 142, the process determines that incoming Market Order E is a Buy Order. In step 146, the process adds the quantity of incoming Order E (2000) to the UnpricedBuyVolume (1000) to derive the updated UnpricedBuyVolume=3000 shares.

In step 148, the process inserts Order E in the auction order book, in time priority behind Orders B and C. The auction order book looks like this:

| Bids | Offers |
|---|---|
| Order B: Buy 600 @ Market | Order D: Sell 1500 @ Market |
| Order C: Buy 400 @ Market | |
| Order E: Buy 2000 @ Market ← | |

In step 150, the process computes the Auction Imbalance by subtracting the UnpricedSellVolume (1500) from the UnpricedBuyVolume (3000) to derive an updated ImbalanceVolume of +1500. In step 152, the process checks whether the computed ImbalanceVolume (+1500) is greater than zero. As the ImbalanceVolume is greater than zero, the process continues to step 154, where it publishes the ImbalanceVolume and denotes it as an excess of interest on the buy side. In step 162, the process then returns, and continues to step 134 (FIG. 6), where the Indicative Match Volume routine 62 is invoked next.

In step 172, the invoked process checks whether the UnpricedBuyVolume is greater than zero. In this example, the UnpricedBuyVolume=3000, so the process continues to step 174, where it checks whether the UnpricedSellVolume is also greater than zero. As the UnpricedSellVolume=1500, orders can match in the upcoming unpriced order auction. To determine the quantity that can match in the unpriced order auction, the process continues to step 178, where it checks whether the UnpricedBuyVolume (3000) is greater than the UnpricedSellVolume (1500). As the UnpricedBuyVolume is greater, the process continues to step 180, where it sets the MatchVolume=1500 shares, the value of the UnpricedSellVolume. In step 184, the process publishes the MatchVolume to the marketplace. The advertised auction looks like this:

| Symbol | Auction Imbalance | Indicative Match Volume | Match Price |
|---|---|---|---|
| XYZZ | +1500 Buy | 1500 | |

Example 6: Existing Market Sell Order Size is Decreased, Reducing the Matched Volume while Increasing the Buy Imbalance Volume During the designated Pre-Auction period, the posting market center 20 receives the following request to change the size of Market Sell Order D:
Cancel/Replace Order D: Replace Sell 1500 @ Market with Sell 900 @ Market In this example, a Cancel/Replace request is processed much like a new order in that the new order replaces an existing order. The process determines the issue is eligible to participate in the unpriced order auction, determines that the scheduled time has not commenced yet (steps 102, 104, 106, 120, 122, and 124), and proceeds to step 140. In step 142, the process determines that cancel/replaced Order D is a sell order, and therefore cancels the existing order quantity (1500 shares) and adds the revised order quantity (900 shares) to the aggregate sell interest, whose quantity is reflected in the UnpricedSellVolume. In step 144, the process computes the updated UnpricedSellVolume=900 shares.

In step 148, the process cancel/replaces Order D in the auction order book. The auction order book looks like this:

| Bids | Offers |
|---|---|
| Order B: Buy 600 @ Market | Order D: Sell 900 @ Market ← |
| Order C: Buy 400 @ Market | |
| Order E: Buy 2000 @ Market | |

In step 150, the process computes the Auction Imbalance by subtracting the UnpricedSellVolume (900) from the UnpricedBuyVolume (3000) to derive an updated ImbalanceVolume of +2100. In step 152, the process checks whether the computed ImbalanceVolume (+2100) is greater than zero. As the ImbalanceVolume is greater than zero, the process continues to step 154, where it publishes the ImbalanceVolume and denotes it as an excess of interest on the buy side. In step 162, the process then returns, and continues to step 134 (FIG. 6), where the Indicative Match Volume routine 62 is invoked next.

In step 172, the invoked process checks whether the UnpricedBuyVolume is greater than zero. In this example, the UnpricedBuyVolume=3000, so the process continues to step 174, where it checks whether the UnpricedSellVolume is also greater than zero. As the UnpricedSellVolume=900, orders can match in the upcoming unpriced order auction. To determine the quantity that can match in the unpriced order auction, the process continues to step 178, where it checks whether the UnpricedBuyVolume (3000) is greater than the UnpricedSellVolume (900). As the UnpricedBuyVolume is greater, the process continues to step 180, where it sets the MatchVolume=900 shares, the UnpricedSellVolume. In step 184, the process publishes the MatchVolume to the marketplace. The advertised auction looks like this:

| Symbol | Auction Imbalance | Indicative Match Volume | Match Price |
|---|---|---|---|
| XYZZ | +2100 Buy | 900 | |

Example 7: Scheduled Auction Time Commences

Referring to FIG. 5, in step 122 the Continuous Unpriced Order Auction routine 56 determines that it is now time to execute the scheduled auction for this issue, and proceeds to step 126, where it initiates the procedures to execute the unpriced order auction.

Referring to FIG. 9, in step 192, the process checks if the UnpricedBuyVolume (3000) is greater than zero. As it is, the process continues to step 194, where it checks if the UnpricedSellVolume (900) is also greater than zero. As it is, in step 196, the process checks whether the UnpricedBuyVolume exceeds the UnpricedSellVolume. As the UnpricedBuyVolume (3000) is greater than the UnpricedSellVolume (900), in step 200 the process sets the computed MatchVolume=900, the UnpricedSellVolume, as the lesser of the two quantities determines the size of the match.

In step 202, the process pairs the market buy orders with the market sell order in time priority. The auction order book presently looks like this:

| Bids | Offers |
|---|---|
| Order B: Buy 600 @ Market. | Order D: Sell 900 @ Market |
| Order C: Buy 400 @ Market | |
| Order D: Buy 2000 @ Market | |

In this example, the orders are paired as follows:
600 shares of Buy Order B match 600 shares of Sell Order D, completely depleting Order B.
300 shares of Buy Order C match 300 shares of Sell Order D, completely depleting Order D.
Partially-matched Order C still has 100 shares remaining. Order E is unmatched. The auction order book now looks like this:

| Bids | Offers |
|---|---|
| Order C: Buy 100 @ Market | |
| Order E: Buy 2000 @ Market | |

The process adds the unmatched orders to the UnmatchedOrders data structure 29c.

In step 204, the process adds the paired orders to the MatchedOrders data structure 29d:
 Order B: 600 shares pending match with Order D
 Order D: 600 shares pending match with Order B
 Order C: 300 shares pending match with Order D
 Order D: 300 shares pending match with Order C
In step 206, the process invokes the NBBO Midpoint Pricing routine 66, as indicated.

Example 8: Crossed NBBO is Ineligible to Price the Auction

Referring to FIG. 10, in step 222, the process retrieves the first published NBBO quote after the scheduled auction time, i.e., after 09:30 am ET in this example. The following NBBO quote is retrieved:
 Market Center A: Bid 500 @ 20.04 Market Center B: Offer 1100 @ 20.03
In step 224, the process checks whether the NBBO quote is crossed. As the NBBO is indeed crossed, i.e., the NBB ($20.04) is higher than the NBO ($20.03), the process continues to step 226, where it waits for the next published NBBO quote. The reason for this is because a crossed NBBO is not allowed to price the unpriced order auction according to the business rules of the posting market center 20.

Example 9: Locked NBBO is Ineligible to Price the Auction

In this example, the following NBBO quote is published next:
 Market Center A: Bid 500 @ 20.04 Market Center B: Offer 600 @ 20.04
The process returns to step 224, where it checks whether the NBBO quote is crossed. As the quote is not crossed, it continues to step 228, where it checks whether the NBBO is locked. As the NBBO is indeed locked, i.e., the NBB ($20.04) is equal to the NBO ($20.04), the process proceeds to step 230, where it checks whether the business rules of the posting market center 20 permit a locked NBBO to price the unpriced order auction or not. Although in one embodiment of the invention, a locked NBBO is allowed to price the unpriced order auction (in which case, the process would continue to step 234, where it would set the AuctionPrice=$20.04, the locked NBBO price), for purposes of illustration, in this example, a locked NBBO is not allowed to price the unpriced order auction. Therefore, the process continues instead to step 226, where it waits for the next published NBBO quote.

Example 10: Unpriced Order Auction is Priced at the Midpoint of the NBBO

In this example, the following NBBO quote is published next:

Market Center A: Bid 300 @ 20.04 Market Center B: Offer 700 @ 20.05

The process returns to step 224, where it checks if the NBBO is crossed. As the NBBO is not crossed, the process continues to step 228, where it checks if the NBBO is locked. As the NBBO is not locked, the process continues to step 232, where it calculates the midpoint of the NBBO. The midpoint of the NBB ($20.04) and the NBO ($20.05) is computed as $20.045. As previously explained, although this issue does not trade in subpennies, and limit orders to buy or sell at $20.045 would therefore be rejected as invalid by the order matching engine 21, this subpenny price is valid in this implementation of the invention because it represents the true computed midpoint price. In step 236, the process sets the AuctionPrice=20.045, and in step 238, it returns to where it was invoked, in step 206 (FIG. 9).

The process continues to step 208, where it assigns the computed AuctionPrice as the trade price for the paired orders on the MatchedOrders data structure 29*d*:

Order B: Execute 600 shares @ 20.045 with Order D
Order D: Execute 600 shares @ 20.045 with Order B
Order C: Execute 300 shares @ 20.045 with Order D
Order D: Execute 300 shares @20.045 with Order C In step 210, the process executes the trades and reports them to the Tape. As this example is an opening auction, the execution reports include the relevant identifier for opening trades.

600 @ 20.045, opening trade
300 @ 20.045, opening trade

The process also publishes the auction price and volume to the marketplace:

| Symbol | Auction Imbalance | Matched Volume | Match Price |
|---|---|---|---|
| XYZZ | | 900 | 20.045 |

Example 11: Unexecuted Market Orders are Released for Trading in the Marketplace Continuing to step 212, the process checks whether there are any unmatched market orders in the UnmatchedOrders data structure 29*c*, which presently looks like this:

| Bids | Offers |
|---|---|
| Order C: Buy 100 @ Market | |
| Order E: Buy 2000 @ Market | |

As unmatched market orders are remaining after the completion of the unpriced order auction, the process releases the orders to the continuous matching engine 52 for further execution opportunities in step 214:

Order C: Buy 100 @ Market
Order E: Buy 2000 @ Market

Having released the orders, the process stops as shown in step 216. The unpriced order auction process has concluded.

Example 12: Unexecuted Market Orders Trade in the Marketplace

Throughout the entire Pre-Auction period, the continuous matching engine 52 has maintained a separate order book 29*a*. In this example, for purposes of illustration, an internal book is shown with limit orders resident on the posting market center 20, as well as the Best Bid and Offer from each market center on data structure 25, Market Center A ("Away Market A") 24*a* and Market Center B ("Away Market B") 24*b*.

The NBBO is 20.04 to 20.05 (300×900).
The internal book looks like this:

| Bids | Offers |
|---|---|
| Away Market A: Buy 300 @ 20.04 | Order 456: Sell 200 @ 20.05 |
| Order 123: Buy 200 @ 20.02 | Away Market B: Offer 700 @ 20.05 |
| Away Market B: Buy 600 @ 20.01 | Order 789: Sell 1400 @ 20.07 |
| | Away Market A: Offer 2200 @ 20.08 |

The continuous matching engine 52 processes the released market orders as if they were newly received on the posting market center 20. The market buy orders are no longer eligible to match at the midpoint of the NBBO, they must now execute at the NBO price instead. The continuous matching engine 52 matches 100 shares of Market Buy Order C with 100 shares of posted Sell Order 456 at the Sell Order's price of $20.05, completely depleting Market Buy Order C.

The internal Book now looks like this:

| Bids | Offers |
|---|---|
| Away Market A: Buy 300 @ 20.04 | Order 456: Sell 100 @ 20.05 ← |
| Order 123: Buy 200 @ 20.02 | Away Market B: Offer 700 @ 20.05 |
| Away Market B: Buy 600 @ 20.01 | Order 789: Sell 1400 @ 20.07 |
| | Away Market A: Offer 2200 @ 20.08 |

The process then matches 100 shares of Market Buy Order E with the remaining 100 shares of Sell Order 456 at the Sell Order's price of $20.05, completely depleting Sell Order 456 and removing it from the internal book. Market Buy Order E still has 1900 shares remaining. The continuous matching engine 52 then routes 700 shares of Market Buy Order E to Away Market B at its Offer price of $20.05.

The NBBO is now 20.04 to 20.05 (300×700), as Away Market B has not moved its offer yet. The internal book looks like this:

| Bids | Offers |
|---|---|
| Away Market A: Buy 300 @ 20.04 | Away Market B: Offer 700 @ 20.05 |
| Order 123: Buy 200 @ 20.02 | Order 789: Sell 1400 @ 20.07 |
| Away Market B: Buy 600 @ 20.01 | Away Market A: Offer 2200 @ 20.08 |

Market Buy Order E still has 1200 shares available to trade. As market buy orders can only execute at the NBO and Sell Order 789 ($20.07) is inferior to the NBO ($20.05), the remaining shares of Market Buy Order E are momentarily queued until the NBO changes. This momentary queuing is illustrated below by displaying Order E in reverse text. Order E is shown included in the internal book because if an incoming marketable sell order (i.e., priced at $20.05 or lower) were to be received while Market Buy Order E is queued, the orders would match.

The internal book momentarily looks like this:

| Bids | Offers |
|---|---|
| Order E: Buy 1200 @ Market ← | Away Market B: Offer 700 @ 20.05 |
| Away Market A: Buy 300 @ 20.04 | Order 789: Sell 1400 @ 20.07 |
| Order 123: Buy 200 @ 20.02 | Away Market A: Offer 2200 @ 20.08 |
| Away Market B: Buy 600 @ 20.01 | |

Away Market B fills the 700 shares routed to it and moves its Offer to $20.07. The NBO is now 2100 @ 20.07. The internal book momentarily looks like this:

| Bids | Offers |
|---|---|
| Order E: Buy 1200 @ Market | Order 789: Sell 1400 @ 20.07 |
| Away Market A: Buy 300 @ 20.04 | Away Market B: Offer 700 @ 20.07 ← |
| Order 123: Buy 200 @ 20.02 | Away Market A: Offer 2200 @ 20.08 |
| Away Market B: Buy 600 @ 20.01 | |

The continuous matching engine 52 matches the remaining shares of Market Buy Order E with 1200 shares of Sell Order 789 at the Sell Order's price of $20.07. Market Buy Order E is completely depleted. Sell Order 789 still has 200 shares remaining.

The NBBO is now 20.04 to 20.07 (300×900). The internal book looks like this:

| Bids | Offers |
|---|---|
| Away Market A: Buy 300 @ 20.04 | Order 789: Sell 200 @ 20.07 ← |
| Order 123: Buy 200 @ 20.02 | Away Market B: Offer 700 @ 20.07 |
| Away Market B: Buy 600 @ 20.01 | Away Market A: Offer 2200 @ 20.08 |

Example 13: Market Orders Await a Scheduled Unpriced Order Auction on an Equity Options Marketplace In this embodiment of the invention, market orders received for equity option issues on the posting market center 20 during a designated Pre-Auction period are processed in the same manner as for equity security issues. As described in the preceding examples, market orders eligible to participate in the upcoming unpriced order auction are queued in the auction order book 29b, and the Auction Imbalance Volume and Indicative Match Volume are advertised to the marketplace. Meanwhile, limit orders are processed separately but concurrently in the continuous matching engine 52, which has its own separate book 29a. As the processing is the same for equity securities and equity options throughout the Pre-Auction period, this example illustrating the unpriced order auction process 50 for an equity option issue starts with an auction order book 29b that already includes four market orders.

The auction order book presently looks like this:

| Bids | Offers |
|---|---|
| Order F: Buy 60 @ Market | Order H: Sell 90 @ Market |
| Order G: Buy 40 @ Market | |
| Order I: Buy 200 @ Market | |

In this example, the UnpricedBuyVolume=300 contracts (60+40+200). The UnpricedSellVolume=90 contracts. The ImbalanceVolume=210 contracts (300 Buy contracts less 90 Sell contracts) and reflects a Buy Imbalance. The MatchVolume=90 contracts. The advertised auction looks like this:

| Symbol | Auction Imbalance | Indicative Match Volume | Match Price |
|---|---|---|---|
| XYZUH | +210 Buy | 90 | |

Example 14: Market Orders Match in the Unpriced Order Auction

At the scheduled auction time, the unpriced order auction process pairs the queued market orders as follows:
  60 contracts of Buy Order F match 60 contracts of Sell Order H, completely depleting Buy Order F.
  30 contracts of Buy Order G match 30 contracts of Sell Order H, completely depleting Sell Order H.
Partially-matched Order G still has 10 contracts remaining. Order I is unmatched. The auction order book now looks like this:

| Bids | Offers |
|---|---|
| Order G: Buy 10 @ Market | |
| Order I: Buy 200 @ Market | |

The process adds the unmatched orders to the UnmatchedOrders data structure 29c.

In step 204, the process adds the paired orders to the MatchedOrders data structure 29d:
  Order F: 60 contracts pending match with Order H
  Order H: 60 contracts pending match with Order F
  Order G: 30 contracts pending match with Order H
  Order H: 30 contracts pending match with Order G
In step 206, the process continues to the NBBO Midpoint Pricing Process, as indicated.

Example 15: Unpriced Order Auction is Priced at the Midpoint of the NBBO

Referring to FIG. 10, in step 222, the process retrieves the first published NBBO quote after the scheduled auction time, e.g., after 09:30 am ET. In this example, the underlying stock is listed on a market center that is already open for trading. The following NBBO quote is retrieved:
  Market Center A: Bid 30 @ 2.00 Market Center B: Offer 70 @ 2.05
The process continues to step 224, where it checks if the NBBO is crossed. As the NBBO is not crossed, the process continues to step 228, where it checks if the NBBO is locked. As the NBBO is not locked, the process continues to step 232, where it calculates the midpoint of the NBBO. The midpoint of the NBB ($2.00) and the NBO ($2.05) is computed as $2.025. Although this issue currently trades in increments of $0.05, and limit buy orders or sell orders priced at $2.025 would be rejected as invalid by the order matching engine 21, this computed price is valid in this implementation of the invention because it represents the true computed midpoint price. In step 236, the process sets the AuctionPrice=$2.025, and in step 238, it returns to where it was invoked, in step 206 (FIG. 9).

The process continues to step 208, where it assigns the computed AuctionPrice as the trade price for the paired orders on the MatchedOrders data structure 29*d*:
Order F: Execute 60 contracts @ 2.025 with Order H
Order H: Execute 60 contracts @ 2.025 with Order F
Order G: Execute 30 contracts @ 2.025 with Order H
Order H: Execute 30 contracts @ 2.025 with Order G In step 210, the process executes the trades and reports them to the Tape. As this example is an opening auction, the execution reports include the relevant identifier for opening trades:
60 @ 2.025, opening trade
30 @ 2.025, opening trade
The process also publishes the auction price and volume to the marketplace:

| Symbol | Auction Imbalance | Match Volume | Match Price |
|---|---|---|---|
| XYZUH | | 90 | 2.025 |

Example 16: Unexecuted Market Orders are Released for Trading in the Marketplace Continuing to step 212, the process checks whether there are any unmatched market orders in the UnmatchedOrders data structure 29*c*, which presently looks like this:

| Bids | Offers |
|---|---|
| Order G: Buy 10 @ Market | |
| Order I: Buy 200 @ Market | |

As unmatched market orders remain after the completion of the unpriced order auction, the process releases the orders to the continuous matching engine 52 for further execution opportunities in step 214:
Order G: Buy 10 @ Market
Order I: Buy 200 @ Market
Having released the orders, the process stops as shown in step 216. The unpriced order auction process has terminated.

Example 17: Unexecuted Market Orders Trade in the Marketplace

Throughout the entire Pre-Auction period, the continuous matching engine 52 has maintained a separate order book. In this example, for purposes of illustration, an internal order book 29*a* is shown with limit orders resident on the posting market center 20. Also for purposes of illustration, a combined Quote Book is shown that includes Market Maker Quotes 33 published by Market Makers 31 assigned to make markets in this issue on the posting market center 20, as well as the Best Bids and Offers on data structure 25 published by the away market centers 24. In this example, the issue has an assigned Lead Market Maker LMM. According to the business rules of the posting market center 20, when the LMM is quoting at the NBBO, an incoming order may be eligible to be processed in the Lead Market Maker Guarantee Process, a set of procedures that are part of the continuous matching engine 52 in this example.

The NBBO is 2.00 to 2.05 (30×170) when the unmatched market orders 29*c* are released to the continuous matching engine 52. The order book looks like this:

| Bids | Offers |
|---|---|
| Order 012: Buy 20 @ 1.95 | Order 345: Sell 10 @ 2.05 |
| Order 678: Buy 10 @ 1.90 | Order 910: Sell 20 @ 2.10 |

The combined Quote Book looks like this:

| Bids | Offers |
|---|---|
| Away Market A: Bid 30 @ 2.00 | LMM: Offer 70 @ 2.05 |
| LMM: Bid 40 @ 195 | Away Market B: Offer 90 @ 2.05 |
| Away Market B: Bid 10 @ 1.95 | Away Market A: Offer 50 @ 2.10 |

The continuous matching engine 52 processes the released market buy orders as if they were newly received on the posting market center 20. The market buy orders are no longer eligible to match at the midpoint of the NBBO, they must now execute at the NBO instead. The continuous matching engine 52 must determine the best sell interest in the marketplace. In this example, Order 345 is a Customer Order that has time priority over the LMM Offer at the same price, $2.05. Order 345 is therefore entitled to trade ahead of the LMM quote, as both are priced at the NBO. The continuous matching engine 52 matches the 10 contracts of Market Buy Order G with Sell Order 345, completely depleting both orders.

The order book now looks like this with Order 345 removed:

| Bids | Offers |
|---|---|
| Order 012: Buy 20 @ 1.95 | Order 910: Sell 20 @ 2.10← |
| Order 678: Buy 10 @ 1.90 | |

The combined Quote Book remains unchanged.

The continuous matching engine 52 executes Market Buy Order I next. It determines that the LMM quote is at the NBO, and that no other Book orders have price/time priority. It automatically generates an order to Sell 70 at $2.05 on behalf of the LMM quote and matches 70 contracts of Market Buy Order I against the generated Sell Order. As Market Buy Order I still has 130 contracts available after the match and Away Market B is also quoting at the NBO, the process routes 90 contracts to Away Market B at the price of $2.05.

LMM moves its Offer to $2.10. The combined Quote Book now looks like this (Away Market B has not moved its quote yet):

| Bids | Offers |
|---|---|
| Away Market A: Bid 30 @ 2.00 | Away Market B: Offer 90 @ 2.05 |
| LMM: Bid 40 @ 1.95 | LMM: Offer 70 @ 2.10 ← |
| Away Market B: Bid 10 @ 1.95 | Away Market A: Offer 50 @2.10 |

The NBBO is now 2.00 to 2.05 (30×90).

Market Buy Order I still has 40 contracts available to trade. As market buy orders can only execute at the NBO and Sell Order 910 ($2.10) and the LMM Offer ($2.10) are inferior to the NBO ($2.05), the remaining contracts of Market Buy Order I are momentarily queued until the NBO changes. This momentary queuing is illustrated below by displaying Order I in reverse text. Order I is shown included in the order book because if an incoming marketable Sell Order (i.e., priced at $2.05 or lower) were to be received while Order I is queued, the orders would match.

The order book momentarily looks like this:

| Bids | Offers |
|---|---|
| Order 1: Buy 40 @ Market ← | Order 910: Sell 20 @ 2.10 |
| Order 012: Buy 20 @ 1.95 | |
| Order 678: Buy 10 @ 1.90 | |

Away Market B fills the 90 contracts routed to it, and moves its Offer to $2.10. The NBBO is now 2.00 to 2.10 (30×230).

The combined Quote Book looks like this:

| Bids | Offers |
|---|---|
| Away Market A: Bid 30 @ 2.00 | LMM: Offer 70 @ 2.10 |
| LMM: Bid 40 @ 1.95 | Away Market A: Offer 50 @ 2.10 |
| Away Market B: Bid 10 @ 1.95 | Away Market B: Offer 90 @ 2.10 ← |

As Order 910 is at the NBO and has time priority over the LMM quote, the continuous matching engine 52 matches 20 contracts of Market Buy Order I with Sell Order 910, completely depleting Sell Order 910 and removing it from the order book.

The order book momentarily looks like this:

| Bids | Offers |
|---|---|
| Order 1: Buy 20 @ Market ← | |
| Order 012: Buy 20 @ 1.95 | |
| Order 678: Buy 10 @ 1.90 | |

As Market Buy Order I still has 20 contracts available to trade and the LMM Offer is at the NBO, the continuous matching engine 52 automatically generates an order to Sell 20 at $2.10 on behalf of the LMM quote, and matches Market Buy Order I with the generated Sell Order. Market Buy Order I is completely matched. The LMM Offer still has 50 contracts available.

The order book looks like this:

| Bids | Offers |
|---|---|
| Order 012: Buy 20 @ 1.95 | |
| Order 678: Buy 10 @ 1.90 | |

The combined Quote Book looks like this:

| Bids | Offers |
|---|---|
| Away Market A: Bid 30 @ 2.00 | LMM: Offer 50 @ 2.10 ← |
| LMM: Bid 40 @ 1.95 | Away Market A: Offer 50 @ 2.10 |
| Away Market B: Bid 10 @ 1.95 | Away Market B: Offer 90 @ 2.10 |

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

The invention claimed is:

1. A system comprising:
a computer system comprising at least one processor and non-transitory memory storing executable program code, execution of the executable program code causing the computer system configured to:
schedule a single-price auction for shares of an issue to occur intra-day at a scheduled auction time concurrently with and separately from a continuous matching process executed by a continuous matching engine of the computer system;
receive, by an order and execution interface of the computer system, a plurality of electronic orders comprising one or more limit orders that include a specified price and one or more unpriced orders that do not include a specified price;
automatically direct, by the order and execution interface, the one or more limit orders to the continuous matching engine and the one or more unpriced orders to an unpriced order auction engine of the computer system;
continuously update and disseminate in real-time, by the unpriced order auction engine, until the scheduled auction time, an auction imbalance volume comprising a difference between an aggregate volume of the one or more unpriced orders to buy shares and an aggregate volume of the one or more unpriced orders to sell shares;
responsive to disseminating the auction imbalance volume, receive, by the order and execution interface, one or more of the following responses until the scheduled auction time: one or more new unpriced orders, one or more cancellations of previously received unpriced orders, and one or more instructions requesting modifications to previously received unpriced orders;
update, by the unpriced order auction engine, the auction imbalance volume based on the received one or more responses until the scheduled auction time; and
execute, by the unpriced order auction engine, the single-price auction at the scheduled auction time, wherein the continuous matching process is not interrupted by the single-price auction at any time before or during the single-price auction, by:
determining, by the unpriced order auction engine, a single auction price comprising a midpoint of a national best bid and offer (NBBO) quote; and
executing, by the unpriced order auction engine, at the determined single auction price, one or more trades of the one or more unpriced orders to buy shares matched with the one or more unpriced orders to sells shares.

2. The system of claim 1, wherein the continuous matching engine is configured to immediately execute a portion of the one or more limit orders at the specified price.

3. The system of claim 2, wherein the portion of the one or more limit orders are marketable against a public order book.

4. The system of claim 3, wherein the computer system is further configured to store, by the order and execution interface, the one or more unpriced orders in an unpriced auction order book that is separate from the public order book.

5. The system of claim 1, wherein the one or more unpriced orders having the one or more trades executed at the determined single auction price comprise a first portion of the one or more unpriced orders, the computer system being further configured to automatically route, by the unpriced order auction engine, a second portion of the one or more unpriced orders consisting of unpriced orders other than those in the first portion, to the continuous matching engine.

6. The system of claim 5, wherein the computer system is further configured to execute, by the continuous matching engine, the continuous matching process on the second portion of the one or more unpriced orders.

7. The system of claim 5, wherein the computer system is further configured to:
  determine, by the unpriced order auction engine, a maximum matchable quantity comprising a lesser of an aggregate buy volume and an aggregate sell volume;
  determine, by the unpriced order auction engine, an auction imbalance quantity comprising a difference between the maximum matchable quantity and a greater of the aggregate buy volume and the aggregate sell volume; and
  match, by the unpriced order auction engine, the first portion of the one or more unpriced orders up to the maximum matchable quantity.

8. The system of claim 7, wherein the computer system is further configured to:
  determine, by the unpriced order auction engine, whether the NBBO quote is crossed; and
  responsive to the determining that the NBBO quote is crossed, discard, by the unpriced order auction engine, the crossed NBBO quote and evaluate a next NBBO quote.

9. The system of claim 7, wherein the computer system is further configured to:
  determine, by the unpriced order auction engine, whether the NBBO quote is locked; and
  responsive to the determining that the NBBO quote is locked, set, by the unpriced order auction engine, the single auction price as the lock price of the NBBO quote.

10. The system of claim 7, wherein the computer system is further configured to:
  determine, by the unpriced order auction engine, whether the NBBO quote is locked; and
  responsive to the determining that the NBBO quote is locked, discard, by the unpriced order auction engine, the locked NBBO quote and evaluate a next NBBO quote.

11. The system of claim 1, wherein the computer system is further configured to:
  determine, by the unpriced order auction engine, whether a posting market center has market makers assigned to the issue in the single-price auction and whether the market makers publish quotes in the issue; and
  responsive to the determining that the posting market center has market makers assigned to the issue in the single-price auction and that the market makers publish quotes in the issue, exclude, by the unpriced order auction engine, the quotes published by the market makers from the single-price auction.

12. The system of claim 1, wherein the computer system is further configured to:
  determine, by the unpriced order auction engine, whether a posting market center has market makers assigned to the issue in the single-price auction and whether the market makers publish quotes in the issue; and
  responsive to the determining that the posting market center has market makers assigned to the issue in the single-price auction and that the market makers publish quotes in the issue, make, by the unpriced order auction engine, unpriced orders that do not execute in the single-price auction eligible for execution against contraside market maker quotes.

13. The system of claim 1, wherein the scheduled auction time occurs after an opening of trading on a primary listing market center of the issue and before a close of trading on the primary listing market center of the issue.

14. The system of claim 1, wherein the computer system is further configured to continuously update, by the unpriced order auction engine, the auction imbalance volume based on, at least, the received one or more responses.

* * * * *